US012587105B2

(12) United States Patent (10) Patent No.:  US 12,587,105 B2
Kawai et al.                    (45) Date of Patent:       Mar. 24, 2026

(54) POWER CONVERTER

(71) Applicants:Mitsubishi Electric Corporation, Tokyo (JP); National University Corporation Nagaoka University of Technology, Nagaoka (JP)

(72) Inventors: Yu Kawai, Tokyo (JP); Kikuo Izumi, Tokyo (JP); Junichi Itoh, Nagaoka (JP); Hiroki Watanabe, Nagaoka (JP)

(73) Assignees: MITSUBISHI ELECTRIC CORPORATION, Tokyo (JP); NATIONAL UNIVERSITY CORPORATION NAGAOKA UNIVERSITY OF TECHNOLOGY, Nagaoka (JP)

( * ) Notice: Subject to any disclaimer, the term of this patent is extended or adjusted under 35 U.S.C. 154(b) by 190 days.

(21) Appl. No.: 18/700,721

(22) PCT Filed: Nov. 9, 2021

(86) PCT No.: PCT/JP2021/041176
§ 371 (c)(1),
(2) Date: Apr. 12, 2024

(87) PCT Pub. No.: WO2023/084598
PCT Pub. Date: May 19, 2023

(65) Prior Publication Data
US 2024/0413759 A1      Dec. 12, 2024

(51) Int. Cl.
*H02M 3/335* (2006.01)
*H02M 1/00* (2006.01)
(52) U.S. Cl.
CPC ...... *H02M 3/33573* (2021.05); *H02M 1/0048* (2021.05); *H02M 3/33584* (2013.01)

(58) Field of Classification Search
CPC ........... H02M 3/33573; H02M 1/0048; H02M 3/33584
See application file for complete search history.

(56) References Cited

U.S. PATENT DOCUMENTS

| | | | | |
|---|---|---|---|---|
| 8,130,515 B2 * | 3/2012 | Shimada | ................. | H02M 1/32 363/21.02 |
| 12,136,886 B2 * | 11/2024 | Hirota | .................... | H02M 1/08 |
| 2025/0125732 A1 * | 4/2025 | Ishii | .................... | H02M 3/3353 |

OTHER PUBLICATIONS

International Search Report and Written Opinion mailed on Jan. 11, 2022, received for PCT Application PCT/JP2021/041176, filed on Nov. 9, 2021, 9 pages including English Translation.

(Continued)

*Primary Examiner* — Adolf D Berhane
(74) *Attorney, Agent, or Firm* — XSENSUS LLP

(57) ABSTRACT

In a DAB circuit including a first bridge and a second bridge, a boost circuit is shared by connecting reactors between a storage battery and the first bridge. In each leg of the first bridge, in order to increase an absolute value of a reactor current, an ON period of one switching element of a switching element on a high voltage side and a switching element on a low voltage side is provided, and then, an ON period of the other switching element is provided. An ON period length of the one switching element is set according to a control command value of a DC voltage input to the first bridge. An ON period length of the other switching element is set to a time length until an absolute value of the reactor current that has increased during the ON period of the one switching element returns to zero.

9 Claims, 12 Drawing Sheets

(56) References Cited

OTHER PUBLICATIONS

Guo et al., "Design Considerations for p. Controlled Current-Fed DAB Converter to Achieve Full Load Range ZVS with Low Inductor RMS Current", 2020 IEEE Energy Conversion Congress and Exposition, Oct. 30, 2020, pp. 5971-5975.

\* cited by examiner

POWER CONVERTER

CROSS-REFERENCE TO RELATED APPLICATION

The present application is based on PCT filing PCT/JP2021/041176, filed on Nov. 9, 2021, the entire contents of which are incorporated herein by reference.

TECHNICAL FIELD

The present disclosure relates to a power converter.

BACKGROUND ART

A power converter is used that can bidirectionally provide and receive power to and from a power system, a load, or the like using a storage battery for an electric vehicle or the like. It is desirable that such a power converter be capable of charging and discharging the storage battery at high power conversion efficiency from low output to high output within a wide input voltage range for accommodating various rechargeable batteries while achieving isolation between the storage battery and any other equipment.

As a technique for charging and discharging a storage battery at high power conversion efficiency from low output to high output within a wide input voltage range by a bidirectional isolated converter, which is one type of power converter, a circuit configuration including a multi-phase boost circuit and a dual active bridge (DAB) circuit that are integrated with each other is disclosed in "Design Considerations for PPS Controlled Current-Fed DAB Converter to Achieve Full Load Range ZVS with Low Inductor RMS Current" (NPL 1).

CITATION LIST

Patent Literature

NPL 1: Jing Guo et al., "Design Considerations for PPS Controlled Current-Fed DAB Converter to Achieve Full Load Range ZVS with Low Inductor RMS Current", 2020 IEEE Energy Conversion Congress and Exposition pp. 5971-5975, Oct. 30, 2020

SUMMARY OF INVENTION

Technical Problem

In the current fed (CF)-DAB circuit including the multiphase boost circuit and the DAB circuit integrated with each other, described in NPL 1, a primary-side bridge of the DAB circuit and a bridge of the multiphase boost circuit are integrated with each other. It is thus feared that, at low output, ripples of a reactor current in a boost circuit portion will travel back and forth between positive and negative electrodes, increasing a conduction loss. On the other hand, the boost circuit operates in a discontinuous current mode so as not to allow ripples of the reactor current to travel back and force between the positive and negative electrodes at low output, reducing a power conduction loss.

In the CF-DAB circuit of NPL 1, however, when switching of a high-voltage-side power device of the boost circuit portion is stopped during the discharging operation of a primary-side storage battery in order to achieve the current discontinuity mode, switching of the high-voltage-side power device of the primary-side bridge of the DAB circuit portion also stops. As a result, the power transmission operation during discharging of the storage battery cannot be performed while such switching is stopped.

Similarly, in the CF-DAB circuit of NPL 1, when switching of the low-voltage-side power device of the boost circuit portion is stopped during the charging operation of the primary-side storage battery in order to achieve the current discontinuity mode, switching of the low-voltage-side power device of the primary-side bridge of the DAB circuit portion also stops. As a result, the power transmission operation during charging of the storage battery cannot be performed while such switching is stopped.

However, the problem of failed power transmission operation due to the introduction of the current discontinuity mode, as described above, is not taken into account in NPL 1.

The present disclosure has been made to solve the above problem. An object of the present disclosure is to improve, in a power converter configured to share a primary-side bridge of a DAB circuit and a boost circuit, power conversion performance by controlling a reactor current for boosting voltage in a discontinuous current mode and achieving a period in which power is transmitted by the DAB circuit.

Solution to Problem

According to one aspect of the present disclosure, a power converter is provided. The power converter that performs DC (direct-current) voltage conversion includes a first bridge including a plurality of first legs, a second bridge including a plurality of second legs, a transformer connected between the first bridge and the second bridge, a plurality of reactors, and a control circuit to control ON and OFF of a plurality of switching elements of each of first legs and the second legs. Each of the first legs includes a switching element on a high voltage side and a switching element on a low voltage side connected in series between a first power line on the high voltage side and a second power line on the low voltage side with an intermediate node in between. Each of the second legs includes a switching element on the high voltage side and a switching element on the low voltage side connected in series between a third power line on the high voltage side and a fourth power line on the low voltage side with an intermediate node in between. The transformer includes a primary winding and a secondary winding. The primary winding is connected to a plurality of the intermediate nodes of the first legs. The secondary winding is connected to a plurality of the intermediate nodes of the second legs and is magnetically coupled to the primary winding. The reactors are respectively connected between a chargeable DC power supply and the intermediate nodes of the first legs. The control circuit controls, in the first bridge, according to a first control command value for controlling a first DC voltage between the first power line and the second power line, ON and OFF of respective switching cycles of the switching elements of the first legs so as to provide an ON period of one switching element of the switching element on the high voltage side and the switching element on the low voltage side of each of the first legs for increasing an absolute value of a reactor current flowing through each of the reactors, and provide an ON period of the other switching element of the switching element on the high voltage side and the switching element on the low voltage side until the absolute value of the reactor current returns to zero after end of the ON period of the one switching element. The control circuit controls, in the second bridge, ON and OFF of respective switching cycles of the switching elements of the second legs so as to reflect a second control command value for controlling a second DC voltage between the third power line and the fourth power line, and cause an ON period length of the switching element on the high voltage side of each of the second legs is substantially equal to an ON period length of the switching element on the high voltage side of each of the first legs, and an ON period length of the switching element on the low voltage side of each of the second legs is substantially equal to an ON period length of the switching element on the low voltage side of each of the first legs.

Advantageous Effects of Invention

According to the present disclosure, in a power converter configured to share a primary-side bridge of a DAB circuit and a booster circuit, power conversion performance can be improved by controlling a reactor current for boosting voltage in a discontinuous current mode and achieving a period in which power is transmitted by the DAB circuit.

DESCRIPTION OF EMBODIMENTS

Figure 1:
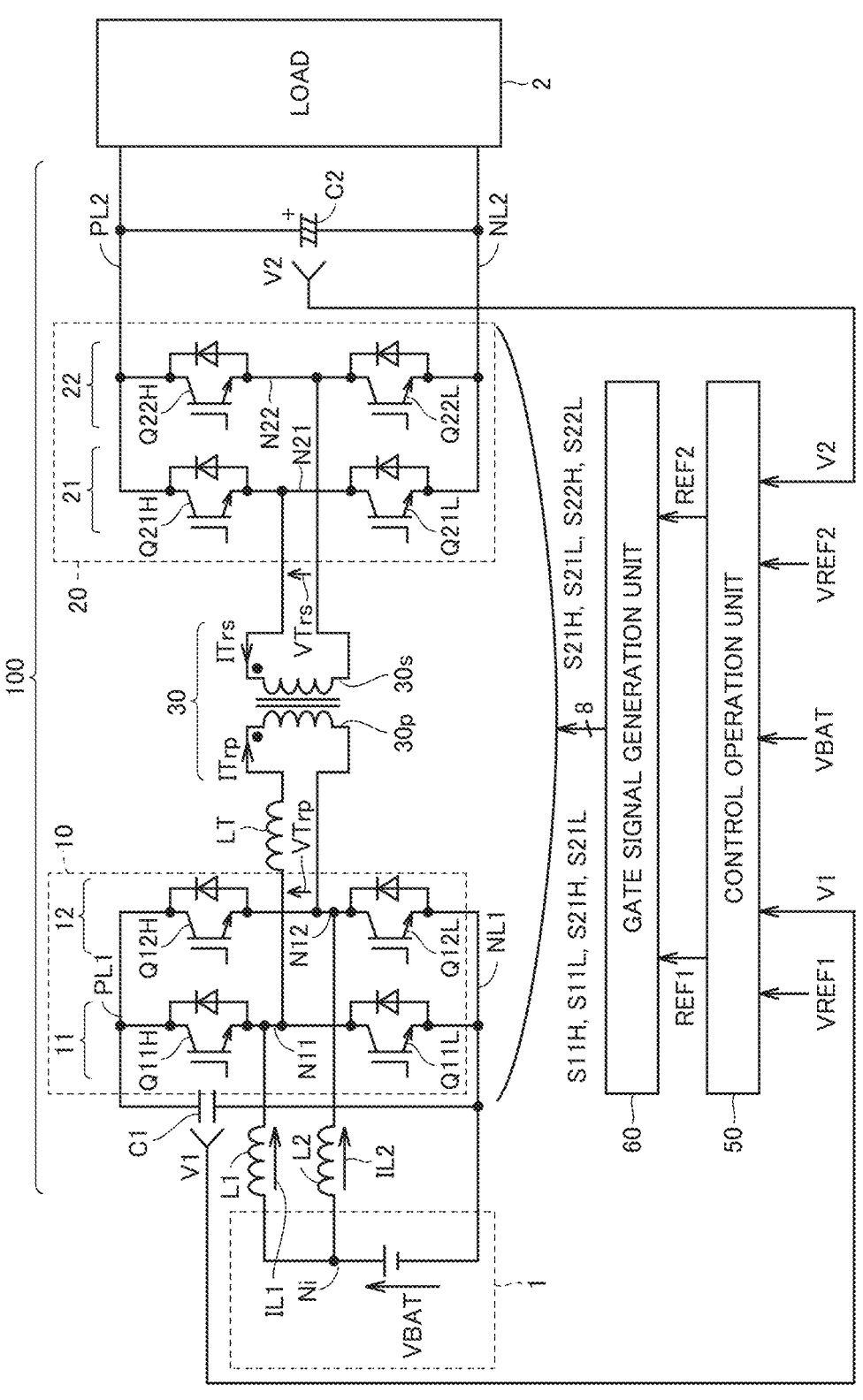
FIG. 1 is a circuit diagram for illustrating a circuit configuration of a power converter according to the present embodiment.

Embodiments of the present disclosure will be described below in detail with reference to the drawings. The same or corresponding components have the same reference characters allotted, and description thereof will not be repeated in principle.

Embodiment 1

(Circuit Configuration)

As shown in FIG. 1, a power converter 100 according to the present embodiment is connected between a storage battery 1 and a load 2 and performs bidirectional DC voltage conversion while electrically isolating storage battery 1 and load 2 by a transformer 30.

Power converter 100 includes a capacitor C1 disposed on the primary side, a capacitor C2 disposed on the secondary side, reactors L1, L2 for a boosting function, a reactor LT, a first bridge 10, a second bridge 20, a transformer 30 including a primary winding 30p and a secondary winding 30s, a control operation unit 50, and a gate signal generation unit 60. A main circuit configuration of power converter 100 is similar to that of the CF-DAB circuit of NPL 1.

First bridge 10 includes a leg 11, which is composed of semiconductor switching elements (hereinbelow, merely referred to as "switching elements" as well) Q11H and Q11L, and a leg 12, which is composed of switching elements Q12H, Q12L. In the present embodiment, each switching element can include an insulated gate bipolar transistor (IGBT), a metal-oxide-semiconductor field-effect transistor (MOSFET), and the like. Each switching element includes, as an external element or an internal element, an antiparallel diode (freewheeling diode) for forming a freewheel path.

Switching elements Q11H and Q11L constituting leg 11 are connected in series between a power line PL1 on the high voltage side and a power line NL1 on the low voltage side on the primary side with a node N11 in between. Switching elements Q12H and Q12L constituting leg 12 are connected in series between power line PL1 and power line NL1 with anode N12 in between. Legs 11 and 12 correspond to one embodiment of "first legs", and each of nodes N11, N12 corresponds to an "intermediate node". Power line PL1 corresponds to one embodiment of a "first power line", and power line NL1 corresponds to one embodiment of a "second power line".

In the configuration example of FIG. 1, capacitor C1 is connected between power line PL1 and power line NL1. In other words, the voltage of capacitor C1 is equal to the DC voltage between power lines PL1 and NL1. Storage battery 1 is connected between anode Ni and power line NL1. Reactor L1 is connected between node Ni (i.e., the positive electrode of storage battery 1) and node N11 of leg 11. Reactor L2 is connected between node Ni and node N12 of leg 12. Reactor LT is connected in series to primary winding 30p of transformer 30 between nodes N11 and N12. Reactors L1 and L2 correspond to one embodiment of "a plurality of reactors".

Reactor LT may be configured with leakage inductances of magnetic coupling of primary winding 30p and secondary winding 30s. Reactors L1 and L2 maybe configured to share a magnetic component for reducing the number of components. For example, reactors L1, L2 can be configured with a loosely-coupled inductor in which two coils are wound around a common magnetic core. Sharing of reactors L1 and L2 brings about an effect of increasing impedance values of reactors L1 and L2 as viewed from a voltage VTrp between nodes N11 and N12, which corresponds to an output end voltage of first bridge 10.

As indicated by the arrows in FIG. 1, for a reactor current IL1 flowing through reactor L1 and a reactor current IL2 flowing through reactor L2, the direction of discharging of storage battery 1 is defined as a positive direction (positive current), and the direction of charging of storage battery 1 is defined as a negative direction (negative current).

Second bridge 20 includes a leg 21, which is composed of switching elements Q21H, Q21L, and a leg 22, which is composed of switching elements Q22H, Q22L. Switching elements Q21H and Q21L constituting leg 21 are connected in series between a power line PL2 on the high voltage side and a power line NL2 on the low voltage side on the secondary side with a node N21 in between. Switching elements Q22H and Q22L constituting leg 22 are connected in series between power line PL2 and power line NL2 with a node N22 in between. Legs 21 and 22 correspond to one embodiment of "second legs", and each of nodes N21, N22 corresponds to an "intermediate node". Power line PL2 corresponds to one embodiment of a "third power line", and power line NL2 corresponds to one embodiment of a "fourth power line".

Hereinbelow, each of switching elements Q11L, Q12L, Q21L, Q22L is also referred to as a "switching element on the low voltage side", and each of switching elements Q11H, Q12H, Q21H, Q22H is also referred to as a "switching element on the high voltage side".

Load 2 is connected to power lines PL2 and NL2. Capacitor C2 is connected in parallel to load 2 between power lines PL2 and NL2. Secondary winding 30s of transformer 30 is connected between nodes N21 and N22. A voltage VTrs between nodes N21 and N22 corresponds to an output end voltage of second bridge 20.

Power converter 100 performs voltage control to maintain a DC voltage V1 of capacitor C1 and a DC voltage V2 of capacitor C2 at voltage command values VREF1 and VREF2, accompanied by charging or discharging of storage battery 1. Voltage command value VREF1 is a command value for controlling a DC voltage between power lines PL1 and NL1, and voltage command value VREF2 is a command value for controlling a DC voltage between power lines PL2 and NL2. In Embodiment 1, DC voltage V1 and DC voltage V2 correspond to a "first DC voltage" and a "second DC voltage", respectively.

Though charging/discharging power of storage battery 1 is not directly indicated, when DC voltage V2 of load 2 is lower than voltage command value VREF2, the voltage control is performed accompanied by a power transmission operation (hereinbelow, also referred to as a discharging operation) from storage battery 1 to load 2, resulting in generation of discharging power from the storage battery. Contrastingly, when DC voltage V2 is higher than voltage command value VREF2, the voltage control is performed accompanied by a power transmission operation (hereinbelow, also referred to as a charging operation) from load 2 to storage battery 1, resulting in generation of charging power of storage battery 1.

Control operation unit 50 calculates a first control command value REF1 and a second control command value REF2 for controlling DC voltages V1 and V2, detected by voltage sensors (not shown) provided in correspondence with capacitors C1 and C2, to voltage command values VREF1 and VREF2, respectively. Control operation unit 50 further receives input of an output voltage (hereinbelow, referred to as battery voltage) VBAT of storage battery 1, which is detected by a voltage sensor (not shown) provided in storage battery 1.

Gate signal generation unit 60 generates gate signals S11H, S11L, S12H, S12L of first bridge 10 and gate signals S21H, S21L, S22H, S22L of second bridge 20 based on first control command value REF1 and second control command value REF2 determined by control operation unit 50.

Switching elements Q11H, Q11L, Q12H, Q12L of first bridge 10 are on/off-controlled (switching-controlled) according to gate signals S11H, S11L, S12H, S12L, respectively. Similarly, switching elements Q21H, Q21L, Q22H, Q22L are on/off-controlled (switching-controlled) according to gate signals S21H, S21L, S22H, S22L, respectively. Specifically, switching elements Q11L, Q12L, Q21L, Q22L, Q11H, Q12H, Q21H, Q22H are turned on during the H level periods of their corresponding gate signals according to gate signals S11L, S12L, S21L, S22L, S11H, S12H, S21H, S22H, respectively, while these switching elements are turned off during the L level periods. As will be described below, one embodiment of a "control circuit" is composed of control operation unit 50 and gate signal generation unit 60.

(Control and Circuit Operation During Discharging Operation)

First, control and operation waveform examples during the discharging operation of power converter 100 will be described with reference to FIGS. 2 and 3.

Figure 2:
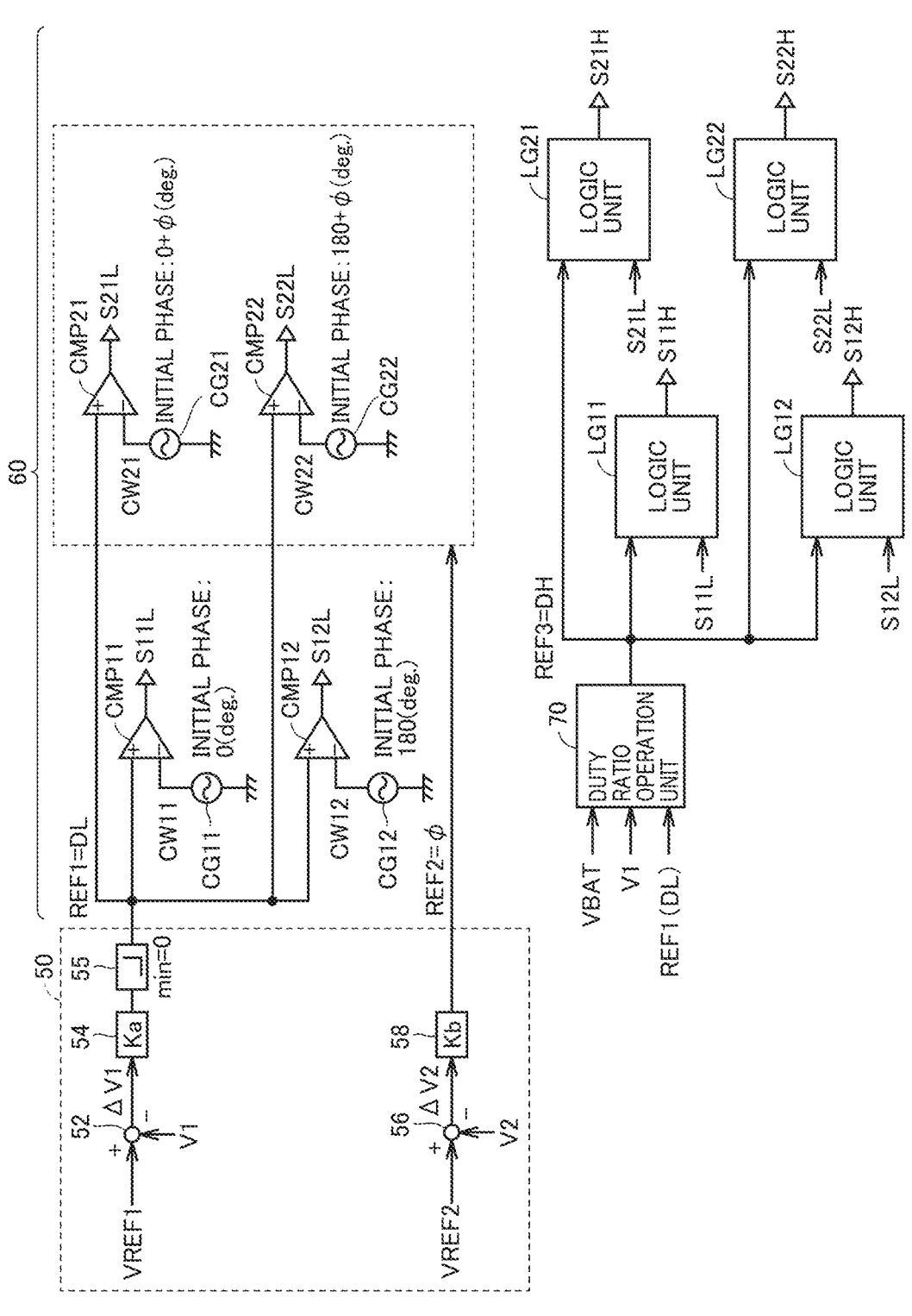
FIG. 2 is a block diagram for illustrating a control operation during a discharging operation of a power converter according to Embodiment 1.

FIG. 2 is a block diagram for illustrating a control operation during the discharging operation of the power converter according to Embodiment 1.

Referring to FIG. 2, control operation unit 50 includes deviation operation units 52, 56, controllers 54, 58, and a limiter 55. Deviation operation unit 52 calculates a voltage deviation ΔV1 of DC voltage V1 (detection value) from voltage command value VREF1 (ΔV1=VREF1−V1). Similarly, deviation operation unit 52 calculates a voltage deviation ΔV2 of DC voltage V2 (detection value) from voltage command value VREF2 (ΔV2=VREF2−V2).

Controller 54 generates first control command value REF1 by a predetermined control operation performed on voltage deviation ΔV1. For example, controller 54 generates first control command value REF1 by proportional (P) control of multiplying voltage deviation ΔV1 by a control gain Ka. First control command value REF1 is controlled by limiter 55 so as to have a minimum value of zero. In other words, VREF1=0 is set when the output value of controller 54 is a negative value. Consequently, REF1=0 is set when DC voltage V1 is higher than voltage command value VREF1.

Controller 58 generates second control command value REF2 by a predetermined control operation performed on voltage deviation ΔV2. For example, controller 58 generates second control command value REF2 by proportional (P) control of multiplying voltage deviation ΔV2 by a control gain Kb. Controllers 54, 58 can be configured to perform any control operation, such as proportional-integral (PI) control, not limited to proportional (P) control.

Gate signal generation unit 60 includes carrier wave generators CG11, CG12, CG21, CG22, comparators CMP11, CMP12, CMP21, CMP22, a duty ratio operation unit 70, and logic units LG11, LG12, LG21, LG22.

During the discharging operation, gate signal generation unit 60 generates gate signals S11L, S12L, S21L, S22L on the low voltage side using first control command value REF1 from control operation unit 50 as a duty ratio DL on the low voltage side. Duty ratio DL on the low voltage side is defined by a time ratio of the ON period to the switching cycle in switching elements Q11L, Q12L, Q21L, Q22L on the low voltage side.

Gate signals S11L, S12L, S21L, S22L on the low voltage side during the discharging operation are generated by carrier wave generators CG11, CG12, CG21, CG22 and comparators CMP11, CMP12, CMP21, CMP22.

Carrier wave generators CG11, CG12, CG21, CG22 generate carrier waves CW11, CW12, CW21, CW22 having the same frequency, respectively. In general, a periodic voltage waveform such as a triangular wave or a sawtooth wave is used for carrier waves CW11, CW12, CW21, CW22. Between carrier waves CW11, CW12, CW21, CW22, a phase difference is set by separate setting of the initial phase. Specifically, carrier wave CW11 and carrier wave CW12 are opposite in phase (phase difference of 180 [deg]), and also, a phase difference of 180 [deg] is provided between carrier wave CW21 and carrier wave CW22.

As a result, in first bridge 10, a phase difference of 180 [deg] is provided between the switching operation of leg 11 and the switching operation of leg 12. Also in second bridge 20, similarly, a phase difference of 180 [deg] is provided between the switching operation of leg 21 and the switching operation of leg 22. Consequently, first bridge 10 and second bridge 20 can operate as a DAB circuit.

Further, a phase difference φ [deg] is provided between carrier waves CW11 and CW12 corresponding to first bridge 10 and between carrier waves CW21 and CW22 corresponding to second bridge 20. Peak to peak of each of carrier waves CW11, CW12, CW21, CW22 corresponds to 0 to 1.0 of duty ratios DL, DH.

In gate signal generation unit 60, the phases of carrier waves CW21 and CW22 corresponding to second bridge 20 are adjusted using second control command value REF2 from control operation unit 50 as this phase difference φ [deg].

As is well known, in the DAB circuit, the direction of power transmission between first bridge 10 and second bridge 20 as the DAB circuit is controlled by the direction (lead/lag) of the phase difference of the switching operation between first bridge 10 and second bridge 20. Moreover, the transmitted power is controlled by the switching frequency and the amount of phase difference. Specifically, it is known that at the same switching frequency, the transmitted power (absolute value) increases as the amount of phase difference is larger, and that with the same phase difference, the transmitted power (absolute value) is larger as the switching frequency is lower (i.e., as the switching cycle is longer).

When DC voltage V2 is lower than voltage command value VREF2, as ΔV2>0 and REF2>0, phase difference φ>0, that is, the phase of the switching operation of second bridge 20 lags behind the phase of the switching operation of first bridge 10. As a result, power is transmitted from first bridge 10 to second bridge 20, allowing DC voltage V2 to rise toward voltage command value VREF2. At this time, as the absolute value of ΔV2 is larger, the amount of phase lag due to phase difference 4 is also set larger, and power transmitted from first bridge 10 to second bridge 20 also increases.

Comparator CMP11 generates gate signal S11L according to the voltage comparison between first control command value REF1 (duty ratio DL on the low voltage side) and carrier wave CW11. Specifically, gate signal S11L is set to the high level ("H level" below) during a period in which REF1>CW11, and gate signal S11L is set to the low level ("L level" below) during a period in which REF1≤CW11. By similar voltage comparison, comparator CMP12 generates gate signal S12L according to voltage comparison between duty ratio DL on the low voltage side and carrier wave CW12. Comparator CMP21 also generates gate signal S21L according to voltage comparison between duty ratio DL on the low voltage side and carrier wave CW21, and comparator CMP22 generates gate signal S22L according to voltage comparison between duty ratio DL on the low voltage side and carrier wave CW22.

Thus, each of gate signals S11L, S12L, S21L, S22L is generated to have an ON period length according to first control command value REF1 for controlling DC voltage V1 to voltage command value VREF1. Further, between gate signals S11L, S12L of first bridge 10 and gate signals S21L, S22 of second bridge 20, a phase difference φ is according to second control command value REF2 for controlling DC voltage V2 to voltage command value VREF2.

In contrast, gate signals S11H, S12H, S21H, S22H on the high voltage side during the discharging operation are generated using, as duty ratio DH on the high voltage side, a third control command value REF3 calculated by duty ratio operation unit 70. Duty ratio DH on the high voltage side is also defined by the time ratio of the ON period to the switching cycle in switching elements Q11H, Q12H, Q21H, Q22H on the high voltage side.

During the discharging operation, duty ratio operation unit 70 calculates duty ratio DH on the high voltage side using duty ratio DL on the low voltage side (first control command value REF1), DC voltage V1, and battery voltage VBAT such that reactor currents IL1, IL2 enter the discontinuous current mode. Herein, description will be given with regard to the technique of calculating duty ratio DH on the high voltage side by a calculation of reactor current IL that encompasses reactor currents IL1, IL2, assuming that reactors L1, L2 have the same inductance value L.

As described above, in first bridge 10, battery voltage VBAT is applied across reactors L1, L2 during the ON periods of switching elements Q11L, Q12L on the low voltage side, according to duty ratio DL on the low voltage side. During the ON period of the switching element on the low voltage side, energy is stored in the reactor.

Thus, reactor current IL (IL>0) during this period of the discharging operation rises with a slope (VBAT/L). For this reason, reactor current IL reaches a maximum value (maximum current ILmax) in the switching cycle at the timing at which switching elements Q11L, Q12L on the low voltage side are turned off according to duty ratio DL. Assuming that IL=0 at the timing of start of turning on switching elements Q11L, Q12L, maximum current ILmax is represented by Expression (1) below using a switching cycle length Ts (a reciprocal of switching frequency fs corresponding to the frequency of the carrier wave, that is, Ts=1/fs).

$$IL\mathrm{max} = (VBAT/L) \times DL \times Ts \qquad (1)$$

Subsequently, in first bridge 10, a negative voltage (VBAT−V1) is applied across reactors L1, L2 during the ON periods of switching elements Q11H, Q12H on the high voltage side, which are provided after turning off switching elements Q11L, Q12L on the low voltage side. Thus, reactor current IL during the ON period decreases with a slope (VBAT−V1)/L, with IL=ILmax as the initial value. During this period, the energy stored in reactors L1, L2 during the ON periods of switching elements Q11L, Q12L on the low voltage side and the energy from storage battery 1 are supplied to power line PL1, thereby implementing a boost function to achieve V1>VBAT.

Switching elements Q11H, Q12H on the high voltage side are switching-controlled after turning off of switching elements Q11L, Q12L on the low voltage side so as to be turned on until reactor current IL drops to zero, that is, to be turned off at an exact timing of IL=0. As switching elements Q11H, Q12H on the high voltage side are turned off at this timing, a path through which a negative current flows to reactors L1, L2 can be interrupted, resulting in the discontinuous current mode. Further, as the ON periods of switching elements Q11H, Q12H on the high voltage side are provided until reactor current IL drops to zero, the path for power transmission from capacitor C1 (power line PL1) to transformer 30 can be achieved also during the period in which reactor currents IL1, IL2 decrease.

In order to set the ON periods of switching elements Q11H, Q12H on the high voltage side in this manner, it is required that reactor current IL0=0 at the end of the ON periods of switching elements Q11H, Q12H on the high voltage side. First, IL0 is represented by Expression (2) below using duty ratio DH on the high voltage side.

$$IL0 = ILmax + DH \times Ts \times (VBAT - V1)/L \qquad (2)$$

It can be seen from Expressions (1), (2) that duty ratio DH at which IL0=0 is given by Expression (3) below.

$$DH = DL \times VBAT/(V1 - VBAT) \qquad (3)$$

Duty ratio operation unit 70 calculates third control command value REF3, that is, duty ratio DH on the high voltage side according to Expression (3) above.

Logic unit LG11 generates gate signal S11H of switching element Q11H on the high voltage side according to gate signal S11L of switching element Q11L on the low voltage side, generated by comparator CMP11, and third control command value REF3 REF3=DH). Specifically, logic unit LG11 generates gate signal S11H such that the H level period for the time length (DH×Ts) according to duty ratio DH, starting from a timing of transition of gate signal S11L from the H level to the L level.

With a similar logic, logic unit LG12 generates gate signal S12H according to gate signal S12L generated by comparator CMP12 and third control command value REF3 (REF3=DH). Logic unit LG21 generates gate signal S21H according to gate signal S21L generated by comparator CMP21 and third control command value REF3 (REF3=DH), and logic unit LG22 generates gate signal S22H according to gate signal S22L generated by comparator CMP22 and third control command value REF3 (REF3=DH).

As duty ratio DH on the high voltage side is set as described above, the switching element on the high voltage side can be turned off at the time when reactor current IL=0 even if duty ratio DL on the low voltage side is set to a small value by control of DC voltage V1 during the discharging operation. In other words, as the switching element on the high voltage side is turned off before reactor current IL has a negative value, reactor current IL (IL1, IL2) can be controlled in the discontinuous current mode in which the period of reactor current IL=0 is continued.

In other words, during the discharging operation, gate signals S11L, S12L, S21L, S22L on the low voltage side are PWM-controlled according to first control command value REF1, whereas gate signals S11H, S12H, S21H, S22H on the high voltage side are switching-controlled to simultaneously achieve the introduction of the discontinuous current mode and power transmission.

Figure 3:
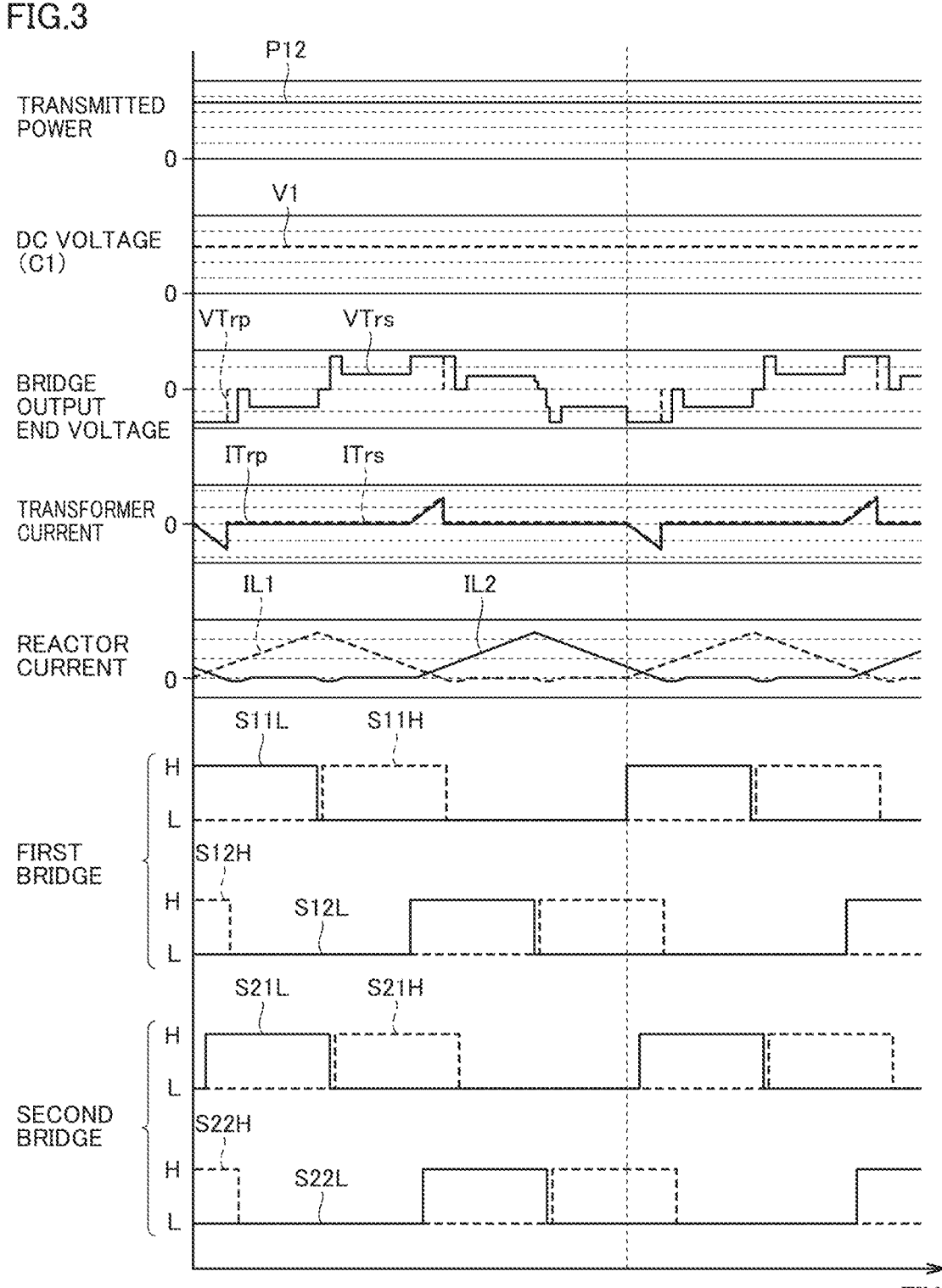
FIG. 3 shows simulation waveform charts for illustrating an operation example during the discharging operation of the power converter according to Embodiment 1.

FIG. 3 shows simulation waveform charts for illustrating an operation example during the discharging operation of power converter 100 by a gate signal generated in FIG. 2.

As shown in FIG. 3, during the discharging operation, transmitted power P12 from first bridge 10 to second bridge 20 has a positive value (P12>0). Also, DC voltage V1 of capacitor C1 is controlled to be constant according to voltage command value VREF1.

In first bridge 10 and second bridge 20, the H level period lengths of gate signals S11L, S12L, S21L, S22L on the low voltage side are set according to duty ratio DL (first control command value REF1) for controlling DC voltage V1. Further, second control command value REF2 is reflected on phase difference $\phi$ [deg] between the initial phases in carrier wave generators CG11, CG12, CG21, CG22 described with reference to FIG. 2.

During the discharging operation, REF2>0 ($\phi$>0) because P12>0, and accordingly, the phases of gate signals S21L, S22L of second bridge 20 lag behind the phases of gate signals S11L, S12L of first bridge 10.

Gate signals S11H, S12H, S21H, S22H on the high voltage side are set to the H level for a period length according to duty ratio DH on the high voltage side from the transition of gate signals S11L, S12L, S21L, S22L on the low voltage side from the H level to the L level. Also as shown in FIG. 3, in each of legs 11, 12, 21, 22, a so-called dead time at which both the gate signals are set to the L level is typically provided between a timing at which the gate signal on the low voltage side changes to the L level and a timing at which the gate signal on the high voltage side changes to the H level.

FIG. 3 further shows waveform charts of output end voltages VTrp, VTrs of first bridge 10 and second bridge 20, transformer currents ITrp and ITrs respectively flowing through primary winding 30p and the secondary winding of transformer 30, and reactor currents IL1, IL2 when first bridge 10 and second bridge 20 operate according to gate signals S11H, S11L, S12H, S12L, S21H, S21L, S22H, S22L as described above.

Output end voltages VTrp, VTrs successively change according to a switching pattern which is a combination of H/L of gate signals S11H, S11L, S12H, S12L, S21H, S21L, S22H, S22L. Also, in the simulation waveforms of FIG. 3, for transformer 30, ITrp is almost equal to ITrs because an ideal transformer (which has an infinite excitation inductance) is provided and the turn ratio is 1:1.

Reactor current IL1 increases (the absolute value increases) during the H level period of gate signal S11L and decreases (the absolute value decreases) during the H level period of gate signal S11H. By setting duty ratio DH according to Expression (3), IL1=0 at the time when gate signal S11H changes from the H level to the L level, and a discontinuous current period can be provided in reactor current IL1 thereafter.

Similarly, reactor current IL2 increases (the absolute value increases) during the H level period of gate signal S12L and decreases (the absolute value decreases) during the H level period of gate signal S12H. By setting duty ratio DH according to Expression (3), IL2=0 at the time when gate signal S12H changes from the H level to the L level, and the discontinuous current period can be provided in reactor current IL2 thereafter.

As a result, during the discharging operation, the power converter according to the present embodiment can control reactor currents IL1, IL2 in the discontinuous current mode with the ON periods provided, without stopping switching elements Q11H, Q12H, Q21H, Q22H on the high voltage side (fixing to OFF).

Moreover, by providing the ON periods of switching elements Q11H, Q12H on the high voltage side, transformer currents ITrs, ITrp are generated during diagonal ON periods of switching elements Q12L, Q11L (on the low voltage side) among the above ON periods. It can be seen from the above that power transmission from first bridge 10 to second bridge 20, that is, power transmission from capacitor C1 via transformer 30 to load 2 (capacitor C2), is performed.

In contrast, when the discontinuous current mode is provided by stopping switching elements Q11H, Q12H on the high voltage side (fixing to OFF), power transmission from first bridge 10 to second bridge 20 cannot be performed during the period in which the absolute values of reactor currents IL1, IL2 decrease.

As described above, the power converter according to the present embodiment allows switching control of first bridge 10 and second bridge 20 that can simultaneously achieve the introduction of the discontinuous current mode for suppressing a conduction loss at low output and securing of power transmission.

(Control and Circuit Operation During Charging Operation)

Next, control and operation waveform examples during the charging operation of power converter 100 will be described with reference to FIGS. 4 and 5.

Figure 4:
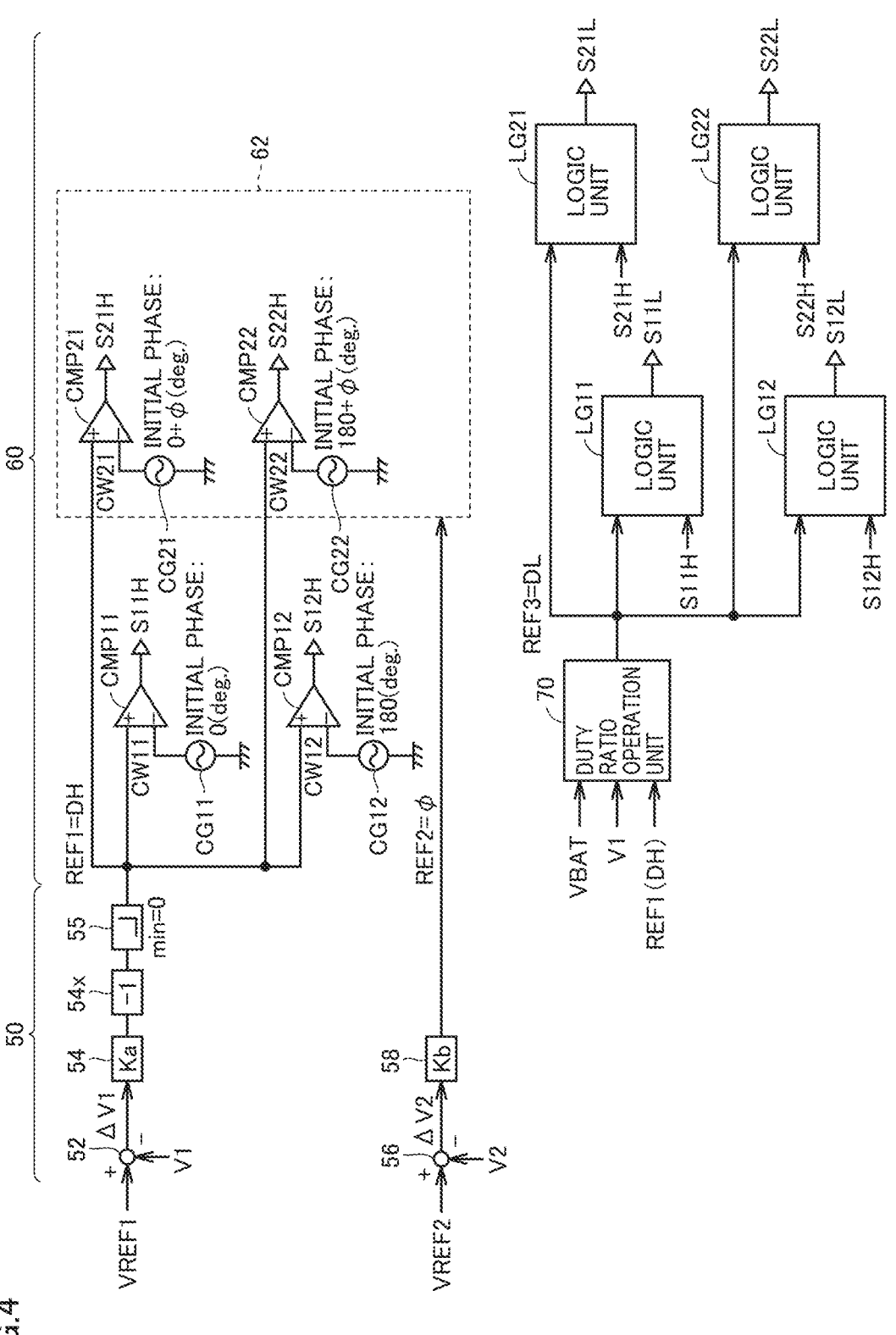
FIG. 4 is a block diagram for illustrating a control operation during a charging operation of the power converter according to Embodiment 1.

Referring to FIG. 4, during the charging operation, control operation unit 50, which further includes a multiplier 54× that multiplies an output value of controller 54 by "−1", generates first control command value REF1. In other words, first control command value REF1 during the charging operation is calculated to impose a limitation such that REF1=0 when voltage command value VREF1 is higher than DC voltage V1, contrary to the case of discharging operation.

On the other hand, voltage deviation ΔV2 is calculated by ΔV2=VREF2−V2 as in the discharging operation. In other words, also during the charging operation, first control command value REF1 is a command value for controlling DC voltage V1 to voltage command value VREF1, and second control command value REF2 is a command value for controlling DC voltage V2 to voltage command value VREF2.

When DC voltage V2 is higher than voltage command value VREF2, as ΔV2<0 and REF2<0, phase difference φ<0, that is, the phase of the switching operation of second bridge 20 leads the phase of the switching operation of first bridge 10. Consequently, as power is transmitted from second bridge 20 to first bridge 10, DC voltage V2 can decrease toward voltage command value VREF2. At this time, as the absolute value of ΔV2 is larger, an amount of phase lead due to phase difference φ is set larger, and power transmitted from second bridge 20 to first bridge 10 also increases.

During the charging operation, gate signal generation unit 60 generates gate signals S11H, S12H, S21H, S22H on the high voltage side using first control command value REF1 from control operation unit 50 as duty ratio DH on the high voltage side. As in the discharging operation, second control command value REF2 is provided to carrier wave generators CG21, CG22 as phase difference φ [deg] of carrier waves CW21, CW22 corresponding to second bridge 20 from carrier waves CW11, CW12 corresponding to first bridge 10.

Thus, comparators CMP11, CMP12, CMP21, CMP22 generate gate signals S11H, S12H, S21H, S22H on the high voltage side by voltage comparison between first control command value REF1 (duty ratio DH on the high voltage side) and carrier waves CW11, CW12, CW21, CW22, respectively, similar to those of FIG. 2.

Gate signals S11L, S12L, S21L, S22L on the low voltage side during the charging operation are generated using, as duty ratio DL on the low voltage side, third control command value REF3 calculated by duty ratio operation unit 70.

During the charging operation in which reactor current IL<0, Expressions (1), (2) above are transformed into Expressions (4), (5) below using a minimum current ILmin (ILmin<0), which is a maximum value of the negative current.

$$ILmin = (VBAT - V1) \times DH \times Ts \qquad (4)$$

$$IL0 = ILmin + (VBAT/L) \times DL \times Ts \qquad (5)$$

It can be seen from Expressions (4), (5) that duty ratio DL at which IL0=0 is given by Expression (6) below.

$$DL = DH \times (V1 - VBAT)/VBAT \qquad (6)$$

During the discharging operation, thus, duty ratio operation unit 70 calculates third control command value REF3, that is, duty ratio DL on the low voltage side, according to Expression (6) above.

Then, logic units LG11, LG12, LG21, LG22 generate gate signals S11L, S12L, S21L, S22L on the low voltage side based on gate signals S11H, S12H, S21H, S22H on the high voltage side and third control command value REF3 (duty ratio DL on the low voltage side).

Specifically, gate signals S11L, S12L, S21L, S22L on the low voltage side are generated such that the H level period for a time length according to duty ratio DL (DL×Ts) is provided, starting from a timing of transition of each of gate signals S11H, S12H, S21H, S22H on the high voltage side from the H level to the L level.

Thus, during the charging operation, contrary to the case of the discharging operation, gate signals S11H, S12H, S21H, S22H on the high voltage side are PWM-controlled according to first control command value REF1, whereas gate signals S11L, S12L, S21L, S22L on the low voltage side are switching-controlled for simultaneously achieving introduction of the discontinuous current mode and power transmission.

Figure 5:
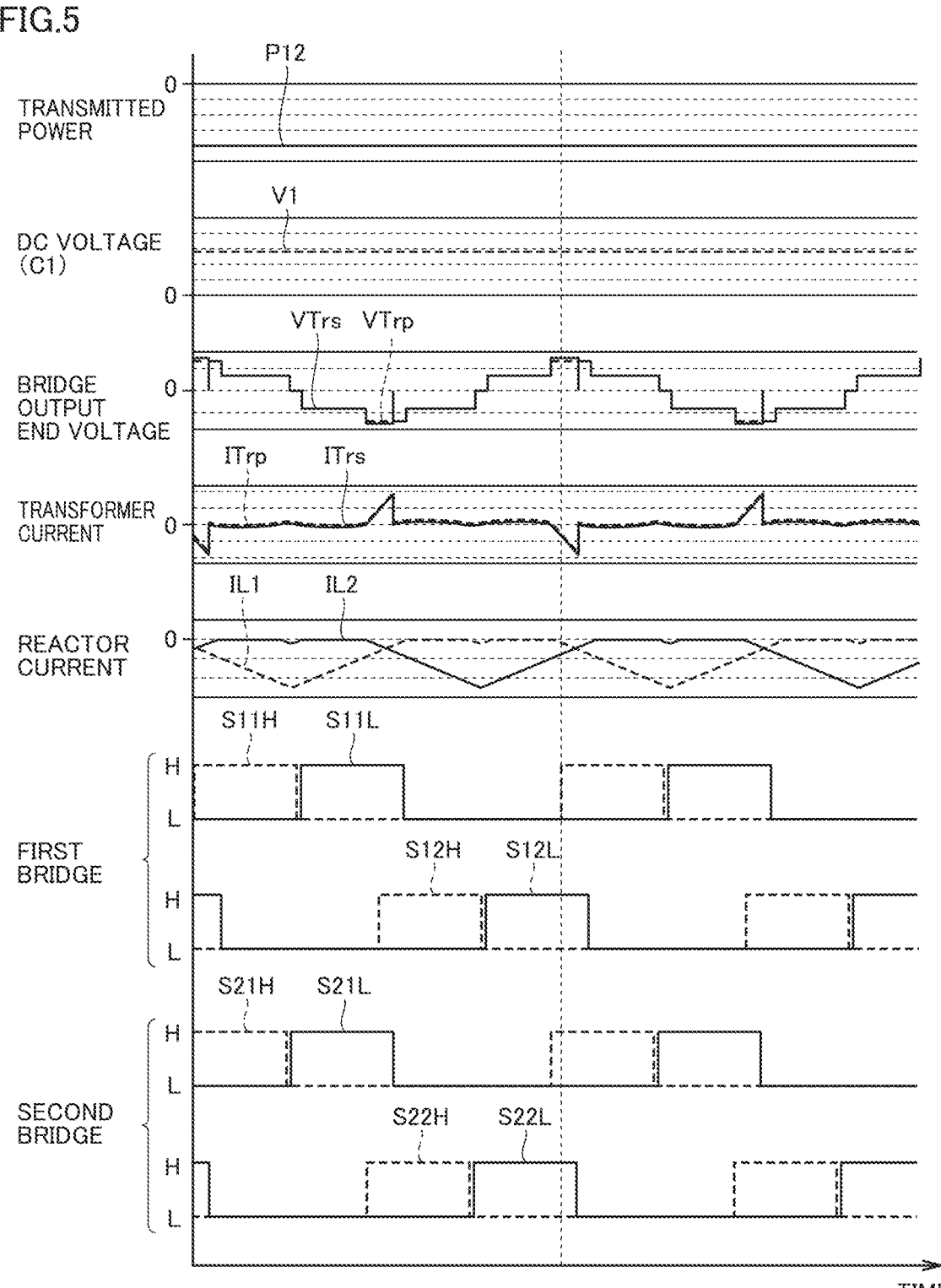
FIG. 5 shows simulation waveform charts for illustrating an operation example during the charging operation of the power converter according to Embodiment 1.

FIG. 5 shows simulation waveform charts for illustrating an operation example during the charging operation of power converter 100 by a gate signal generated in FIG. 4.

As shown in FIG. 5, during the charging operation, transmitted power P12 from first bridge 10 to second bridge 20 has a negative value (P12<0). Also, DC voltage V1 of capacitor C1 is controlled to be constant according to voltage command value VREF1.

In first bridge 10 and second bridge 20, the H level period lengths of gate signals S11H, S12H, S21H, S22H on the high voltage side are set according to duty ratio DH (first control command value REF1) for controlling DC voltage V1.

During the charging operation, REF2<0 (φ<0) because P12<0, and accordingly, the phases of gate signals S21H, S22H of second bridge 20 lead the phases of gate signals S11H, S12H of first bridge 10 as second control command value REF2 is reflected on phase difference φ [deg] between the initial phases in carrier wave generators CG11, CG12, CG21, CG22 in FIG. 4.

Gate signals S11L, S12L, S21L, S22L on the low voltage side are set to the H level for a period length according to duty ratio DL on the low voltage side from the transition of gate signals S11H, S12H, S21H, S22H on the high voltage side from the H level to the L level. Also during the charging operation, in each of legs 11, 12, 21, 22, a dead time is typically provided between a timing at which the gate signal on the high voltage side changes to the L level and a timing at which the gate signal on the low voltage side changes to the H level.

Also, FIG. 5 further shows waveform charts of output end voltages VTrp, VTrs of first bridge 10 and second bridge 20, transformer currents ITrp and ITrs respectively flowing through primary winding 30p and the secondary winding of transformer 30, and reactor currents IL1, IL2 as in FIG. 3 (during the discharging operation).

Reactor current IL1 decreases (the absolute value increases) during the H level period of gate signal S11H and increases (the absolute value decreases) during the H level period of gate signal S11L. By setting duty ratio DL according to Expression (6), IL1=0 at the time when gate signal S11L changes from the H level to the L level, and the discontinuous current period can be provided in reactor current IL1 thereafter.

Similarly, reactor current IL2 decreases (the absolute value increases) during the H level period of gate signal S12H and increases (the absolute value decreases) during the H level period of gate signal S12L. By setting duty ratio DL according to Expression (6), IL2=0 at the time when gate signal S12L changes from the H level to the L level, and the discontinuous current period can be provided in reactor current IL2 thereafter.

As a result, during the charging operation, the power converter according to the present embodiment can control reactor currents IL1, IL2 in the discontinuous current mode with the ON periods provided, without stopping switching elements Q11L, Q12L, Q21L, Q22L on the low voltage side (fixing to OFF).

Moreover, by providing the ON periods of switching elements Q11L, Q12L on the low voltage side, transformer currents ITrs, ITrp are generated during diagonal ON periods of switching elements Q12H, Q12H (on the low voltage side) among the above ON periods. It can be seen from the above that power transmission from second bridge 20 to first bridge 10, that is, power transmission from load 2 (capacitor C2) via transformer 30 to storage battery 1, is performed.

In contrast, when the discontinuous current mode is provided by stopping switching elements Q11L, Q12L on the low voltage side, power transmission from first bridge 10 to second bridge 20 cannot be performed during the period in which reactor currents IL1, IL2 decrease.

As described above, during both the discharging operation and the charging operation, the control operation of the power converter according to Embodiment 1 can improve power conversion performance by introducing switching control of first bridge 10 and second bridge 20 for simultaneously achieving introduction of the discontinuous current mode for suppressing a conduction loss at low output and securing of the power transmission operation.

Gate signal generation unit 60 is configured to have the function to switch between control operations for performing the control operation of FIG. 2 during the discharging operation and performing the control operation of FIG. 4 during the charging operation according to first control command value REF1 and second control command value REF2 from control operation unit 50. For example, control operations during the discharging operation (ΔV2≥0) and during the charging operation (ΔV2<0) can be switched according to the polarity (positive/negative) of voltage deviation ΔV2. Alternatively, gate signal generation unit 60 can be configured so as to perform control during the discharging operation when V1>V2 and perform control during the charging operation when V1<V2, according to the comparison between DC voltages V1 and V2.

Modification of Embodiment 1

Although Embodiment 1 has described a control example in which second control command value REF2 calculated by control operation unit 50 is reflected on phase difference φ[deg] of a carrier wave, second control command value REF2 can also be reflected on the frequency of a carrier wave.

Figure 6:
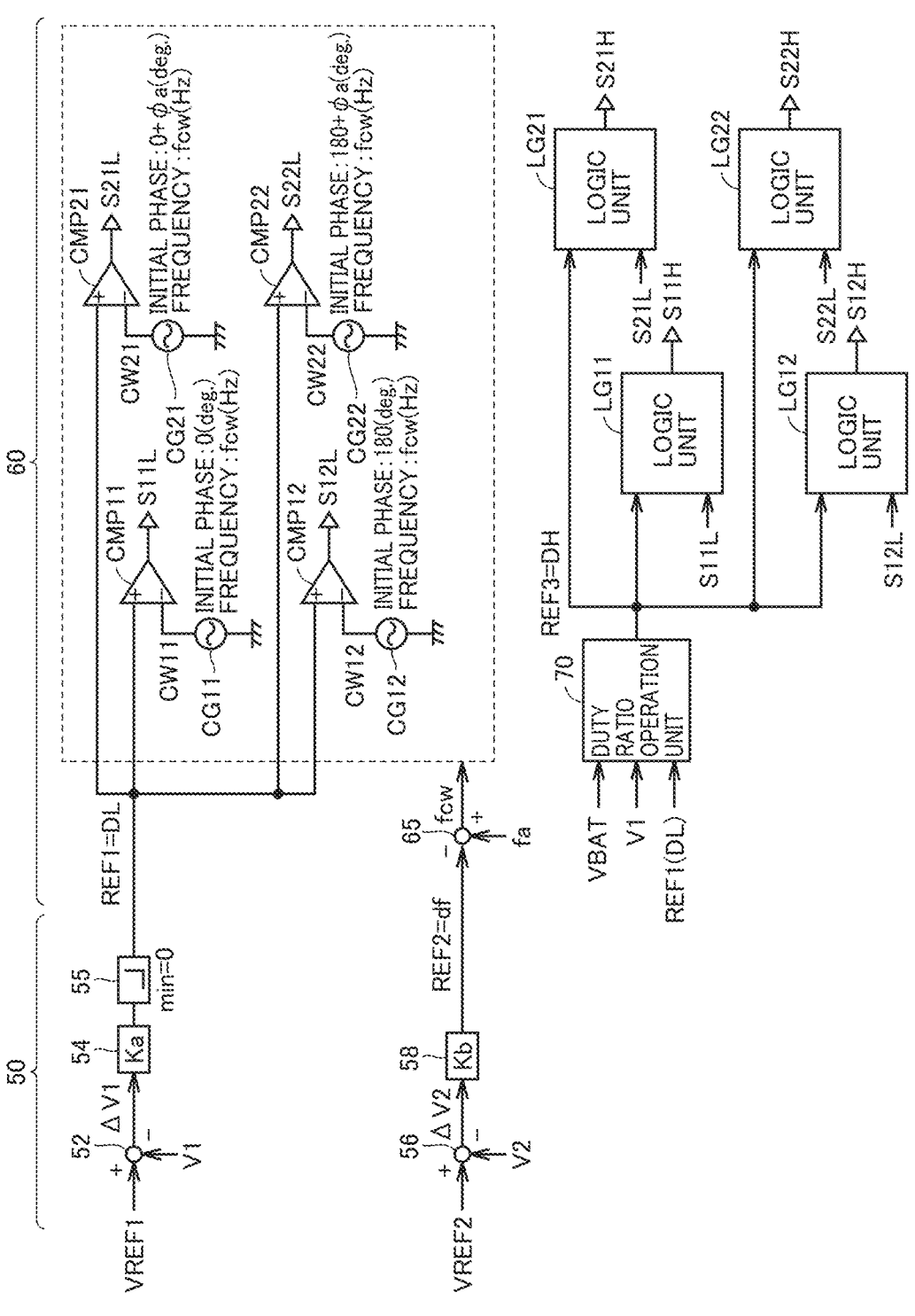
FIG. 6 is a block diagram for illustrating a control operation during a discharging operation of a power converter according to a modification of Embodiment 1.

FIG. 6 is a block diagram for illustrating a control operation during a discharging operation of a power converter according to a modification of Embodiment 1.

Referring to FIG. 6, in the modification according to Embodiment 1, control operation unit 50 calculates, as an amount of frequency change df of carrier waves CW11, CW12, CW21, CW22, second control command value REF2 for controlling DC voltage V2 to voltage command value VREF2. Amount of frequency change df is obtained as a positive value (df>0) during the discharging operation, that is, when ΔV2>0. In contrast, first control command value REF1 is calculated as in Embodiment 1 (FIG. 2).

Gate signal generation unit 60 further includes a carrier frequency setting unit 65 in addition to the components shown in FIG. 2. Carrier frequency setting unit 65 calculates a carrier frequency fcw by subtracting amount of frequency change df from a predetermined reference frequency fa.

In the modification of Embodiment 1, carrier wave generators CG11, CG12, CG21, CG22 generate carrier waves CW11, CW12, CW21, CW22, respectively, having carrier frequency fcw set by carrier frequency setting unit 65. In other words, cycles (1/fcw) of carrier waves CW11, CW12, CW21, CW22 are variable according to second control command value REF2.

Contrastingly, in the modification of Embodiment 1, the phase difference between carrier waves CW11, CW12, CW21, CW22 is fixed. Specifically, the phases of carrier waves CW21 and CW22 corresponding to second bridge 20 are fixed so as to lag a reference phase φa behind the phases of carrier waves CW11 and CW12 corresponding to first bridge 10. In other words, in the modification of Embodiment 1, a phase difference φ[deg] between first bridge 10 and second bridge 20 is fixed to a constant value that does not depend on second control command value REF2 (φ=+φa during the discharging operation).

Comparators CMP11, CMP12, CMP21, CMP22 operate as in FIG. 2 and generate gate signals S11L, S12L, S21L, S22L on the low voltage side by voltage comparison between first control command value REF1 (duty ratio DL on the low voltage side) and carrier waves CW11, CW12, CW21, CW22 having a variable frequency, respectively, as described above.

Further, as in FIG. 2, duty ratio operation unit 70 calculates duty ratio DH on the high voltage side according to Expression (3) above, and logic units LG11, LG12, LG21, LG22 generate gate signals S11H, S12H, S21H, S22H on the high voltage side so as to simultaneously achieve introduction of the discontinuous current mode and power transmission.

In the case of the discharging operation, that is, when voltage deviation ΔV2>0 (VREF2>V2), an amount of decrease in carrier frequency fcw increases as the absolute value of voltage deviation ΔV2 increases, and accordingly, switching cycle length Ts increases. Since the transmitted power from first bridge 10 to second bridge 20 increases in proportion to switching cycle length Ts (Ts=1/fcw), the control operation during the discharging operation which is similar to the control operation described with reference to FIG. 2 can be performed also by control to reflect second control command value REF2 for controlling DC voltage V2 on carrier frequency fcw.

Figure 7:
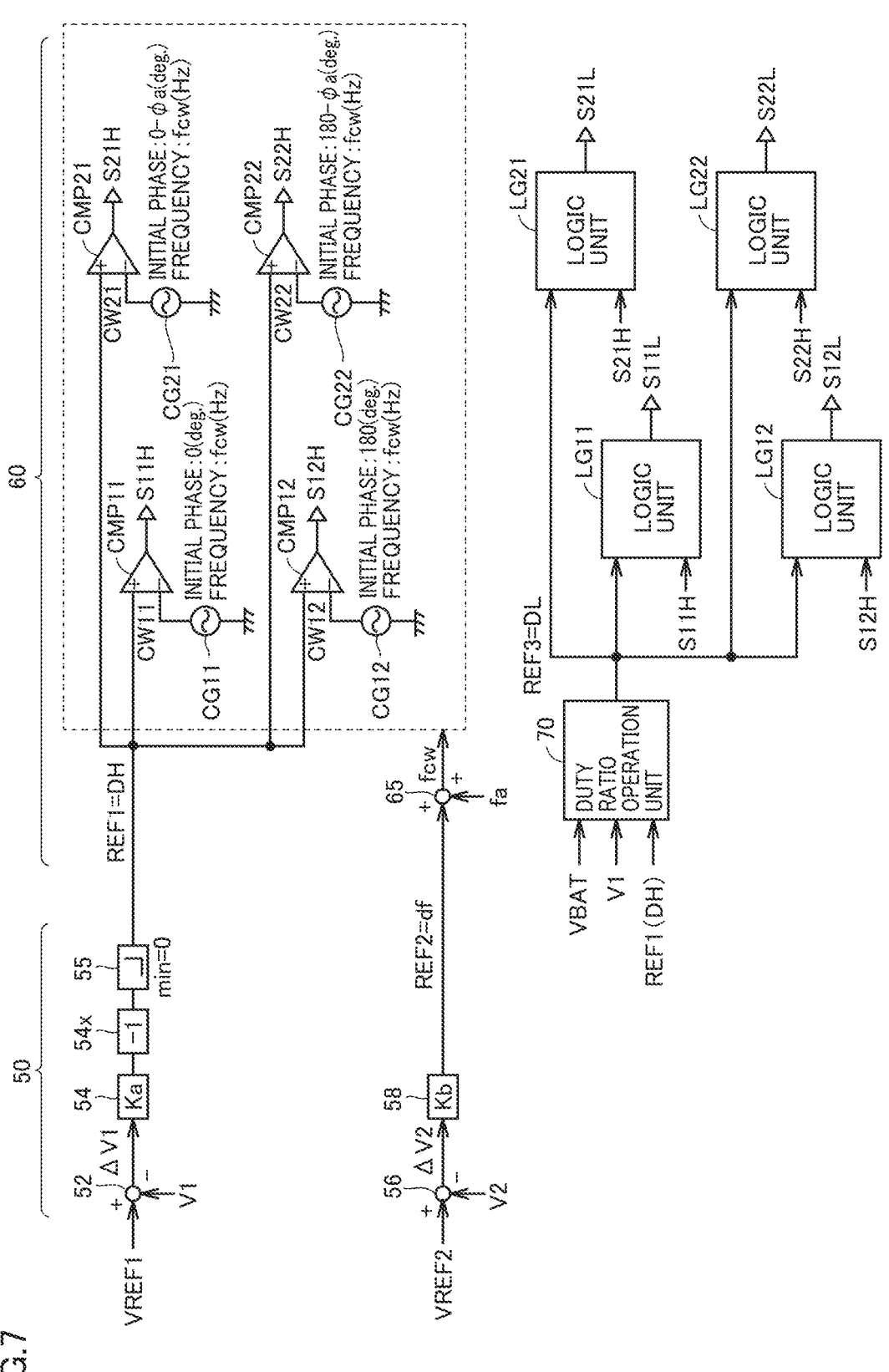
FIG. 7 is a block diagram for illustrating a control operation during the charging operation of the power converter according to the modification of Embodiment 1.

FIG. 7 is a block diagram for illustrating a control operation during the charging operation of the power converter according to the modification of Embodiment 1.

Referring to FIG. 7, in the modification according to Embodiment 1, control operation unit 50 during the charging operation calculates second control command value REF2 for controlling DC voltage V2 to voltage command value VREF2 as amount of frequency change df of carrier waves CW11, CW12, CW21, CW22, as in the discharging operation (FIG. 6). On the other hand, first control command value REF1 during the charging operation is calculated as in Embodiment 1 (FIG. 4).

In gate signal generation unit 60, during the charging operation, carrier frequency setting unit 65 adds amount of frequency change df (second control command value REF2) obtained from voltage deviation ΔV2 (ΔV2<0) set to a negative value to reference frequency fa, to thereby calculate carrier frequency fcw.

Carrier wave generators CG11, CG12, CG21, CG22 change the frequencies of carrier waves CW11, CW12, CW21, CW22, respectively, according to carrier frequency fcw set by carrier frequency setting unit 65 as in the discharging operation (FIG. 6). On the other hand, during the charging operation, unlike in the case of the discharging operation, the phases of carrier waves CW21 and CW22 corresponding to second bridge 20 are fixed so as to lead the phases of carrier waves CW11 and CW12 corresponding to first bridge 10 by reference phase φa (φ=−φa during the charging operation).

As described above, in the modification of Embodiment 1, phase difference φ[deg] between first bridge 10 and second bridge 20 is switched to a lag direction and a lead direction between during the discharging operation and during the charging operation, and switching cycle length Ts in first bridge 10 and second bridge 20 is changed according to a change in switching cycle length Ts on which second control command value REF2 is reflected.

Comparators CMP11, CMP12, CMP21, CMP22 operate as in FIG. 4, and generate gate signals S11H, S12H, S21H, S22H on the high voltage side by voltage comparison between first control command value REF1 (duty ratio DH on the high voltage side) and carrier waves CW11, CW12, CW21, CW22, respectively, generated as described above.

Further, as in FIG. 4, duty ratio operation unit 70 calculates duty ratio DL on the low voltage side according to Expression (6) above, and logic units LG11, LG12, LG21, LG22 generate gate signals S11L, S12L, S21L, S22L on the low voltage side so as to simultaneously achieve introduction of the discontinuous current mode and power transmission.

In the case of the charging operation, that is, when voltage deviation ΔV2<0 (V2>VREF2), an amount of decrease in carrier frequency fcw increases as the absolute value of voltage deviation ΔV2 is larger, and accordingly, switching cycle length Ts increases. Since the transmitted power from second bridge 20 to first bridge 10 increases in proportion to switching cycle length Ts, the control operation during the charging operation which is similar to the control operation described with reference to FIG. 4 can be performed also by control to reflect second control command value REF2 for controlling DC voltage V2 on carrier frequency fcw.

As described above, by the control operation of the power converter according to the modification of Embodiment 1, control of the power converter as in Embodiment 1 can be provided even when second control command value REF2 for controlling DC voltage V2 is reflected on the frequency of the carrier wave, that is, the switching cycle length.

Embodiment 2

Figure 8:
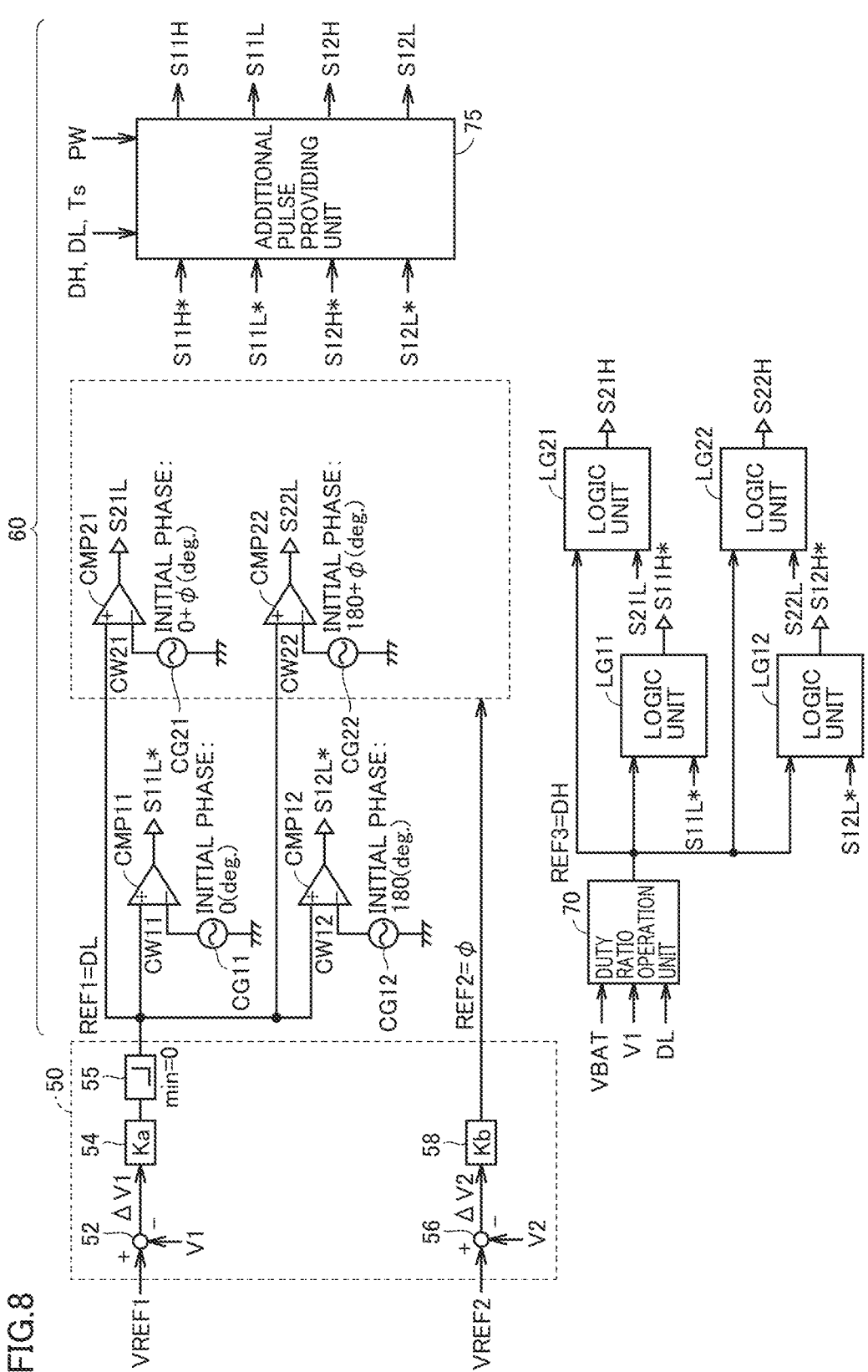
FIG. 8 is a block diagram for illustrating a control operation during a discharging operation of a power converter according to Embodiment 2.

FIG. 8 is a block diagram for illustrating a control operation during a discharging operation of a power converter according to Embodiment 2.

In comparison between FIG. 8 and FIG. 2 that shows the control operation during the discharging operation according to Embodiment 1, Embodiment 2 is different from Embodiment 1 in that gate signal generation unit 60 further includes an additional pulse providing unit 75. The other components of control operation unit 50 and gate signal generation unit 60 are similar to those of FIG. 2.

Gate signals S21L, S21H, S22L, S22H of second bridge 20 are generated as in FIG. 2. On the other hand, gate signals S11H, S11L, S12H, S12L of first bridge 10 generated by control operation unit 50 and gate signal generation unit 60 in FIG. 2 are input to additional pulse providing unit 75 as gate signals S11H*, S11L*, S12H*, S12L.

For the gate signal of first bridge 10, additional pulse providing unit 75 generates gate signals S11H, S11L, S12H, S12L so as to add an ON-pulse for alternately turning on and off the switching elements on the high voltage side and the low voltage side to gate signals S11H*, S11L*, S12H*, S12L* described above during the discontinuous current periods (IL1=0, IL2=0) of reactor currents IL1, IL2.

Figure 9:
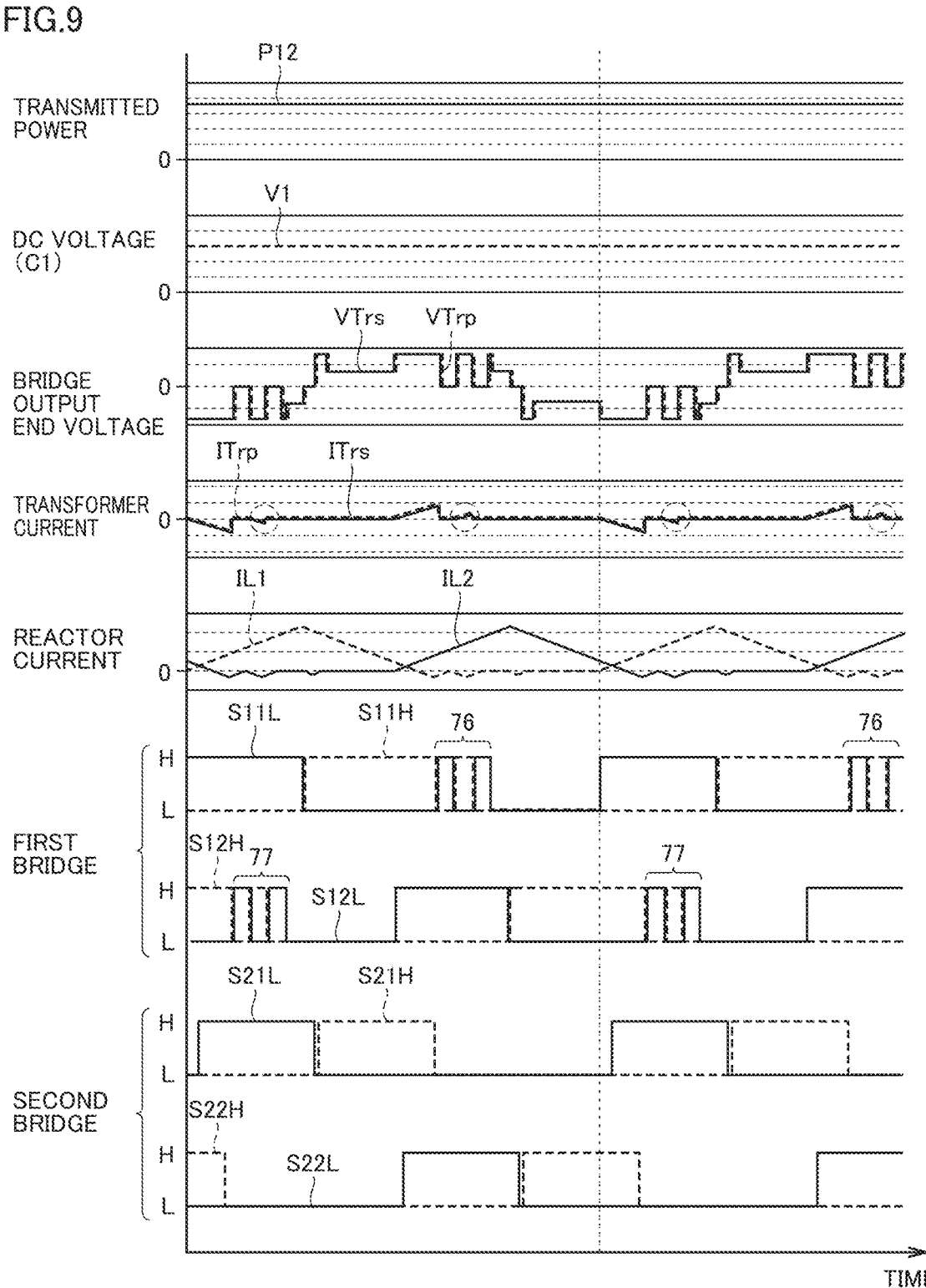
FIG. 9 shows simulation waveform charts for illustrating an operation example during the discharging operation of the power converter according to Embodiment 2.

FIG. 9 shows simulation waveform charts for illustrating an operation example during the discharging operation of power converter 100 by a gate signal generated in FIG. 8.

As shown in FIG. 9, gate signals S21H, S21L, S22H, S22L of second bridge 20 are similar to the waveforms of FIG. 3, without an additional pulse provided.

In contrast, gate signals S11H, S11L, S12H, S12L of first bridge 10 are provided with additional pulses 76, 77. Specifically, gate signals S11L and S11H corresponding to leg 11 are provided with additional pulse 76 during a period (discontinuous current period) in which reactor current IL1=0 until the start of a subsequent switching cycle. As a result, gate signals S11L and S11H are alternately set to the H level and the L level at and after a timing of transition of gate signal S11H (corresponding to gate signal S11H* in FIG. 8) from the H level to the L level in FIG. 3.

Similarly, additional pulse providing unit 75 provides additional pulse 77 to gate signals S12L and S12H corresponding to leg 12 during a period (discontinuous current period) in which reactor current IL2=0 until the start of a subsequent switching cycle. As a result, gate signals S12L and S12H are alternately set to the H level and the L level at and after a timing of transition of gate signal S12H (corresponding to gate signal S12H* in FIG. 8) from the H level to the L level in FIG. 3.

In comparison with the operation waveform example of FIG. 3, as additional pulses 76, 77 are provided as described above, a period in which transformer currents ITrp, ITrs are generated can be provided additionally to the portions surrounded by the dotted lines in FIG. 9. As a result, the amplitudes of transformer currents ITrp, ITrs generated at a similar timing to that of FIG. 3 can be suppressed with the transmitted power equal to that of FIG. 3. This can suppress the maximum currents of transformer 30 as well as the switching elements of first bridge 10 and second bridge 20.

Consequently, power losses in the switching elements and transformer 30 can be reduced to improve power conversion efficiency, increasing transmitted power with the same circuit configuration (element specs).

Herein, the respective pulse widths of additional pulses 76, 77 can be predetermined within the range in which a conduction loss does not increase in reactors L1, L2. Alternatively, in each switching element on the power transmission side, the pulse width can be determined so as to achieve a period length that allows ON and OFF by zero-voltage switching.

Referring again to FIG. 8, the calculated duty ratio DH on the high voltage side, duty ratio DL on the low voltage side, switching cycle length Ts, and pulse width PW are input to additional pulse providing unit 75. The time lengths of the discontinuous current periods of reactor currents IL1, IL2 are determined by Ts×(1−DL−DH) using a duty ratio. Thus, the pulse number included in additional pulses 76, 77 shown in FIG. 9 can be set by using pulse width PW set in terms of a power loss as described above and the calculated time length of the zero-current period.

As described above, additional pulse providing unit 75 performs a logic operation to provide the ON pulse of the provided pulse width PW as additional pulses 76, 77 according to the pulse number that can be added during the period in which reactor currents IL1, IL2=0, determined by the calculation described above, thereby generating gate signals S11H, S11L, S12H, S12L of first bridge 10.

Additional pulse providing unit 75 is also applicable to control during the charging operation. In other words, additional pulse providing unit 75 described above can be further disposed in the configuration of FIG. 4. In this case, gate signals S11H, S11L, S12H, S12L of first bridge 10, generated by control operation unit 50 and gate signal generation unit 60 of FIG. 4, can be input to additional pulse providing unit 75 as reference gate signals S11H*, S11L*, S12H*, S12L*. Consequently, additional pulses 76, 77 similar to those of FIG. 9 can be provided to gate signals S11H, S11L, S12H, S12L of first bridge 10.

Also in the configurations of FIGS. 6 and 7, the modification of Embodiment 1 and Embodiment 2 can be combined by addition of additional pulse providing unit 75.

As described above, by the control operation of the power converter according to Embodiment 2, the power transmission period between first bridge 10 and second bridge 20 can be provided further by providing additional pulses 76, 77. This can suppress a maximum current in transmission of the same power, and accordingly, power conversion performance can be improved further by an improvement in power conversion efficiency owing to a reduction in power loss and by an increase in power that can be actually transmitted.

Embodiment 3

Embodiment 3 will describe a modification of a main circuit configuration of a power converter.

Figure 10:
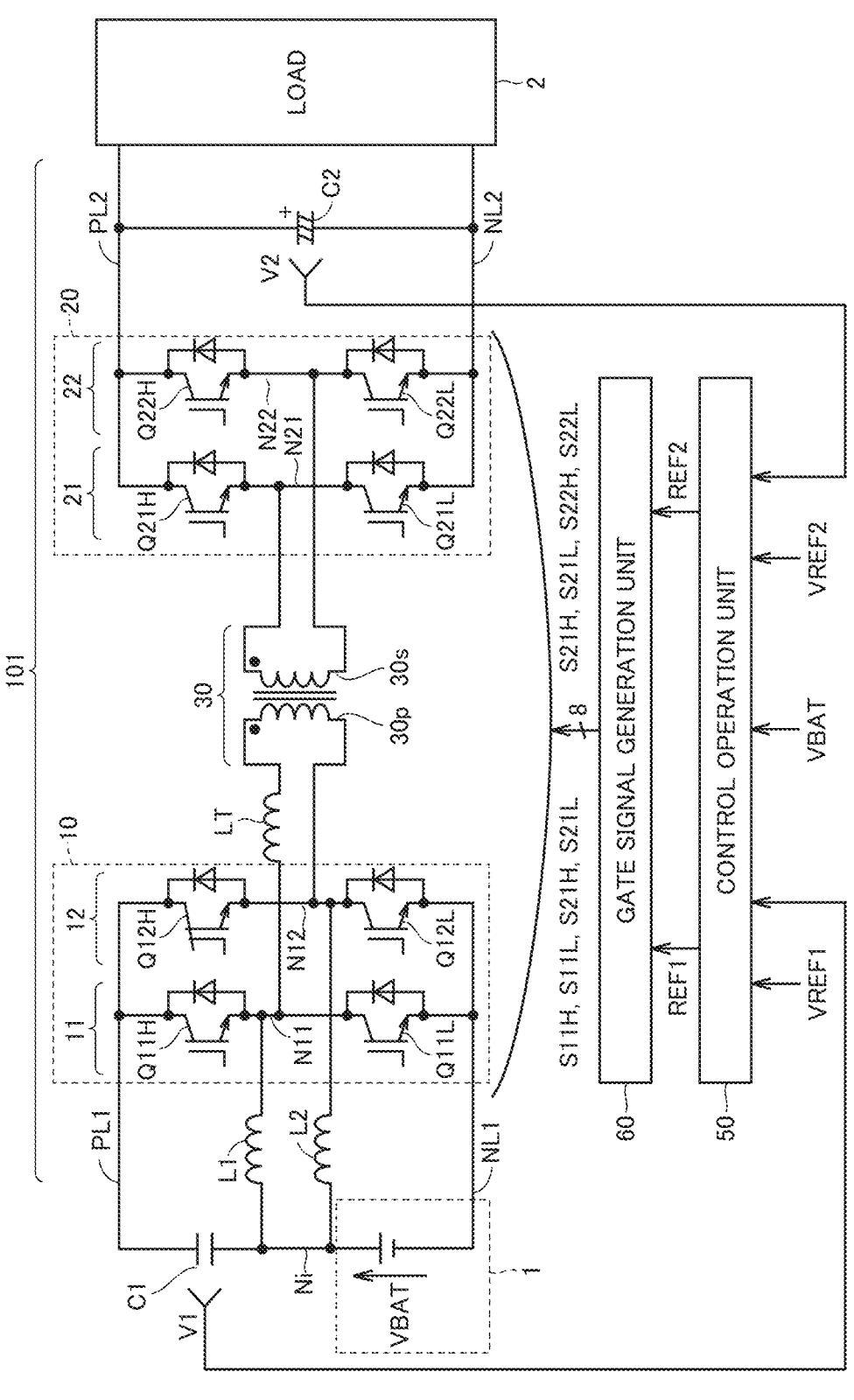
FIG. 10 is a circuit diagram for illustrating a circuit configuration of a power converter according to a first example of Embodiment 3.

FIG. 10 is a circuit diagram for illustrating a circuit configuration of a power converter 101 according to a first example of Embodiment 3.

Referring to FIG. 10, power converter 101 is different from power converter 100 shown in FIG. 1 in a connecting position of capacitor C1. Specifically, capacitor C1 is connected between power line PL1 and node Ni, not between power lines PL1 and NL1 (FIG. 1). In power converter 101, accordingly, capacitor C1 and storage battery 1 are connected in series between power lines PL1 and NL1.

Thus, in power converter 101, voltage command value VREF1 is determined by subtracting battery voltage VBAT from the command value (corresponding to VREF1 in Embodiments 1 and 2) of the DC voltage between power lines PL1 and NL1. Consequently, also in Embodiment 3, voltage deviation ΔV1 for calculating first control command value REF1 can be calculated by ΔV1=VREF1−V1. In other words, also in Embodiment 3, voltage command value VREF1 is a command value for controlling the DC voltage between power lines PL1 and NL1. Voltage command value VREF2 is similar to those of Embodiments 1 and 2. In Embodiment 3, the sum of DC voltage V1 and battery voltage VBAT corresponds to the "first DC voltage". DC voltage V2 corresponds to the "second DC voltage" as in Embodiments 1 and 2.

In comparison, power converter 101 is different from power converter 100 in the voltage applied across reactors L1, L2 during the ON periods of switching elements Q11H and Q21H on the high voltage side of first bridge 10. Consequently, the slopes of reactor currents IL1, IL2 during the periods change as well, and accordingly, changes need to be made to an arithmetic expression for duty ratio DH on the high voltage side during the discharging operation and an arithmetic expression for duty ratio DL on the low voltage side during the charging operation by duty ratio operation unit 70 for appropriately introducing the discontinuous current mode.

Specifically, the voltage applied across reactors L1, L2 during the ON periods of switching elements Q11H and Q21H on the high voltage side is −V1 in FIG. 10, which is (VBAT−V1) in FIG. 1.

During the discharging operation, thus, duty ratio DH on the high voltage side can be calculated according to Expression (7) below obtained by replacing (V1−VBAT) of Expression (3) above with V1.

$$DH = DL \times VBAT/V1 \tag{7}$$

Similarly, during the charging operation, duty ratio DL on the low voltage side can be calculated according to Expression (8) below obtained by replacing (V1−VBAT) of Expression (6) above with V1.

$$DL = DH \times V1/VBAT \tag{8}$$

A control operation similar to the control operation for power converter 100 is applicable to power converter 101 by changing an expression for calculating voltage deviation ΔV1 and replacing the arithmetic expressions used in duty ratio operation unit 70 with Expressions (7) and (8) above in Embodiment 1, the modification thereof, and Embodiment 2. Consequently, power converter 101 according to the first example of Embodiment 3 can also achieve the effects of Embodiment 1, the modification thereof, and Embodiment 2 described above.

Figure 11:
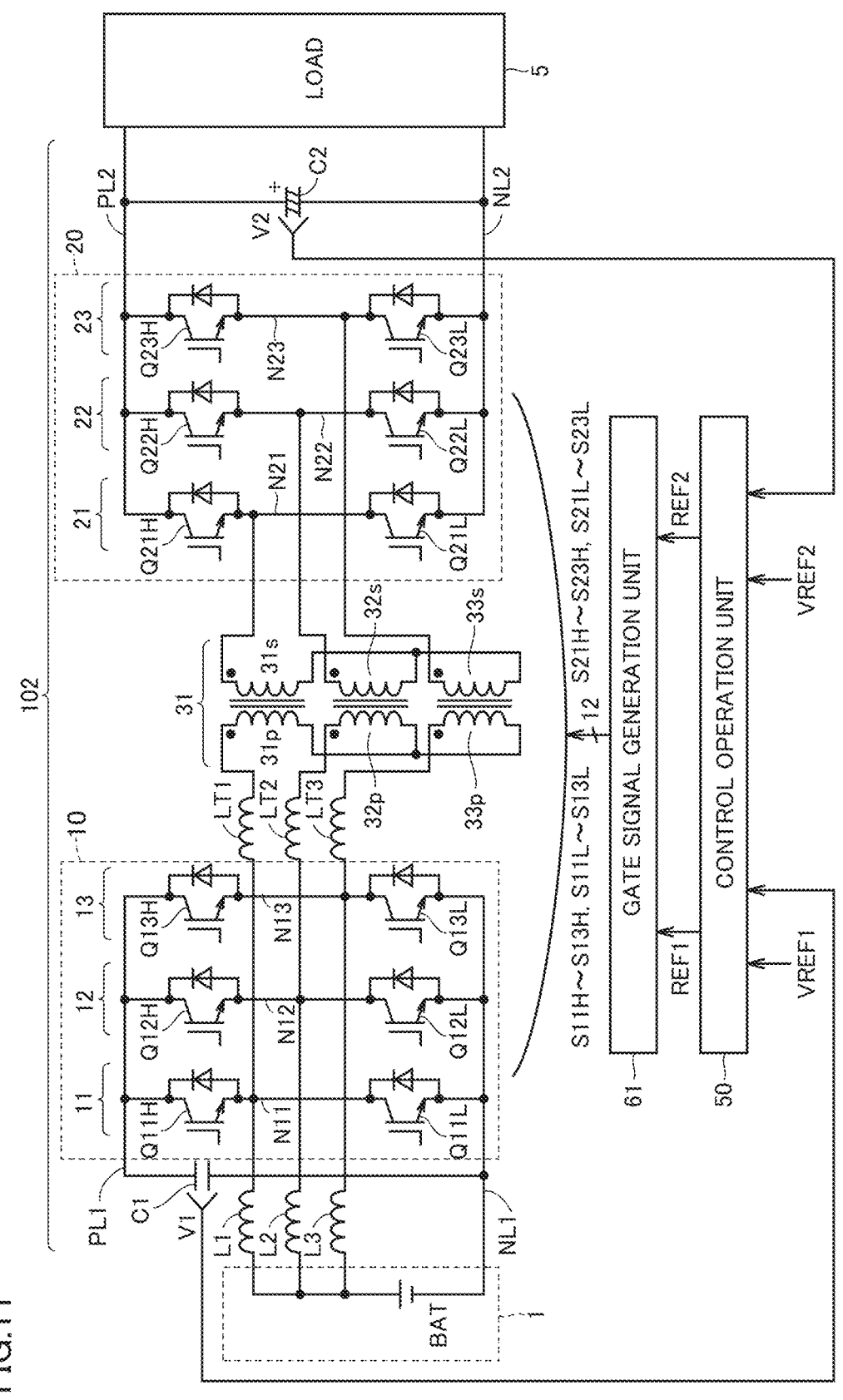
FIG. 11 is a circuit diagram for illustrating a circuit configuration of a power converter according to a second example of Embodiment 3.

FIG. 11 is a circuit diagram for illustrating a circuit configuration of a power converter 102 according to a second example of Embodiment 3.

Referring to FIG. 11, power converter 102 is obtained by configuring each of first bridge 10 and second bridge 20 to have three phases in power converter 100. Thus, a transformer 31 (three-phase transformer) including primary windings 31p, 32p, 33p and secondary windings 31s, 32s, 33s for three phases is connected between first bridge 10 and the second bridge in place of transformer 30 in FIG. 1. Primary winding 31p, primary winding 32p, and primary winding 33p are magnetically coupled to secondary winding 31s, secondary winding 32s, and secondary winding 33s, respectively.

First bridge 10 further includes a leg 13 in addition to legs 11, 12 similar to those of FIG. 1. Leg 13 is composed of a switching element Q13H on the high voltage side and a switching element Q13L on the low voltage side, which are connected in series between power lines PL1 and NL1 with anode N13 in between. Switching elements Q13H and Q13L are ON/OFF-controlled according to gate signals S13H and S13L, respectively. A reactor L3 is connected between node N13 of leg 13 and node Ni (the positive electrode of storage battery 1).

Similarly, second bridge 20 further includes a leg 23 in addition to legs 21, 22 similar to those of FIG. 1. Leg 23 is composed of a switching element Q23H on the high voltage side and a switching element Q23L on the low voltage side, which are connected in series between power lines PL1 and NL1 with a node N23 in between. Switching elements Q23H and Q23L are ON/OFF-controlled according to gate signals S23H and S23L, respectively.

Three-phase transformer 31 is also Y-Y-connected, that is, star-connected to the primary side and the secondary side. Specifically, first ends of primary windings 31p, 32p, and 33p are connected to each other, and second ends of primary windings 31p, 32p, and 33p are connected to nodes N11, N12, and N13, respectively. Similarly, first ends of secondary windings 31s, 32s, and 33s are connected to each other, and second ends of primary windings 31p, 32p, and 33p are connected to nodes N11, N12 and N13, respectively. First bridge 10 and second bridge 20 can be connected to transformer 31 by YΔ connection, ΔY connection, or ΔΔ connection.

Reactors LT1 to LT3 are connected in series to primary windings 31p to 33p, respectively. Reactors LT1 to LT3 can be configured with leakage inductances of magnetic coupling of primary winding 31p and secondary winding 31s, primary winding 32p and secondary winding 32s, and primary winding 33p and secondary winding 33s, respectively.

Figure 12:
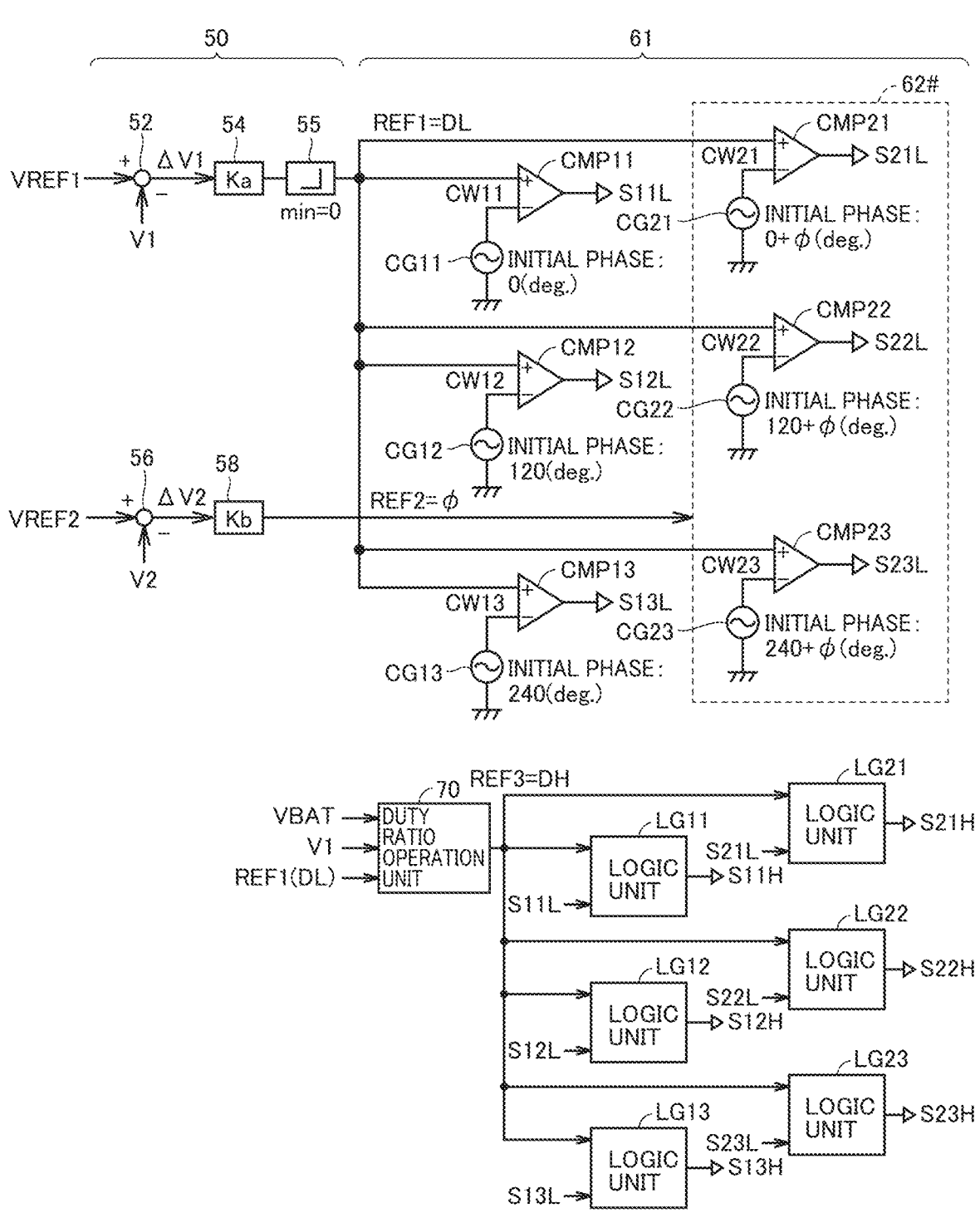
FIG. 12 is a block diagram for illustrating a control operation example (discharging operation) of the power converter shown in FIG. 11.

FIG. 12 is a block diagram showing a control operation example of power converter 102 shown in FIG. 11. FIG. 12 is a block diagram for the control operation during the discharging operation.

As shown in FIG. 12, also in power converter 102, control operation unit 50 is configured similarly to FIG. 2, that is, as in the case of control of power converter 100. On the other hand, a gate signal generation unit 61 is disposed in place of gate signal generation unit 60 of FIG. 2 for generating gate signals of switching elements of three legs.

Gate signal generation unit 61 further includes carrier wave generators CG13, CG23, comparators CMP13, CMP23, and logic units LG13, LG23 corresponding to legs 13, 23, in addition to carrier wave generators CG11, CG12, CG21, CG22, comparators CMP11, CMP12, CMP21, CMP22, duty ratio operation unit 70, and logic units LG11, LG12, LG21, LG22 similar to those of gate signal generation unit 60.

Gate signal generation unit 60 performs a switch operation between two legs of each of first bridge 10 and second bridge 20 with a phase difference of every 180 [deg], whereas gate signal generation unit 61 performs a switch operation among three legs of each of first bridge 10 and second bridge 20 with a phase difference of every 120 [deg]. Consequently, first bridge 10 and second bridge 20 can operate as a DAB circuit.

Thus, in carrier wave generators CG11, CG12, CG13 corresponding to first bridge 10, the initial phases are set to 0 [deg], 120 [deg], and 240 [deg], respectively, such that a phase difference of 120 [deg] is generated in carrier waves CW11 to CW13. The initial phases of carrier wave generators CG21, CG22, CG23 corresponding to second bridge 20 are set to have a phase difference φ[deg] from the initial phases of carrier wave generators CG11, CG12, CG13 corresponding to first bridge 10.

Consequently, during the discharging operation, power is transmitted from first bridge 10 to second bridge 20 as the switching operation of legs 21 to 23 has a phase difference φ[deg] in the direction of lag behind the switching operation of legs 11 to 13.

Comparators CMP11 to CMP13 generate gate signals S11L to S13L by voltage comparison (as in FIG. 2) between duty ratio DL (first control command value REF1) on the low voltage side and carrier waves CW11 to CW13. Similarly, comparators CMP21 to CMP23 generate gate signals S21L to S23L by voltage comparison (as in FIG. 2) between duty ratio DL (first control command value REF1) on the low voltage side and carrier waves CW21 to CW23.

Logic units LG11 to LG13 generate gate signals S11H to S13H based on gate signals S11L to S13L and duty ratio DH on the high voltage side calculated by duty ratio operation unit 70 similar to that of FIG. 2. As described in Embodiment 1, gate signals S21H to S23H are generated such that the H level period is provided for a period length according to duty ratio DH on the high voltage side from the transition of gate signals S11L to S13L from the H level to the L level. Similarly, logic units LG21 to LG23 generate gate signals S21H to S23H based on gate signals S21L to S23L and duty ratio DH on the high voltage side calculated by duty ratio operation unit 70 similar to that of FIG. 2.

As the respective switching elements of first bridge 10 and second bridge 20 are ON/OFF-controlled according to gate signals S11L to S13L, S11H to S13H, S21L to S23L, S21H to S23H generated as described above, power converter 102 shown in FIG. 11 also enables switching control of first bridge 10 and second bridge 20 that can simultaneously achieve the introduction of the discontinuous current mode and securing of power transmission, as in the discharging operation of power converter 100 described in Embodiment 1.

Power converter 102 enables similar control by such a modification that, as in FIG. 12, disposes carrier wave generators CG11 to CG13, CG21 to CG23, comparators CMP11 to CMP13, CMP21 to CMP23, and logic units LG11 to LG13, LG21 to LG23 for three legs in FIG. 4 (during the charging operation), FIG. 7 (during the discharging operation with a variable carrier frequency), and FIG. 8 (during the charging operation with a variable carrier frequency).

Alternatively, power converter 102 can also be configured to connect capacitor C1 between power line PL1 and node Ni (the positive electrode of storage battery 1) in the configuration of FIG. 11, as in FIG. 9. In this case, as described with reference to FIG. 9, the calculation of voltage deviation ΔV1 needs to be changed, and also, an arithmetic expression for the duty ratio in duty ratio operation unit 70 for introducing the discontinuous current mode needs to be changed.

As described above, similar to power converters 100, 101, in power converter 102 in which each of first bridge 10 and second bridge 20 has three legs, power conversion performance can be improved by introducing switching control of first bridge 10 and second bridge 20 for simultaneously achieving the introduction of the discontinuous current mode for suppressing a conduction loss at low output and securing of power transmission during both the discharging operation and the charging operation.

Each of first bridge 10 and second bridge 20 can have any number (N number: N≥2) of legs. In this case, a phase difference is provided for every (360/N) [deg] in the switching operation between an N number of legs of each of first bridge 10 and second bridge 20. As N is increased, currents passing through the reactor and the switching element can be reduced, while a circuit size increases.

A similar circuit operation is achieved at any turn ratio between the primary winding and the secondary winding in transformers 30, 31, other than 1:1. In particular, as the number of turns of the primary winding is set to be greater than the number of turns of the secondary winding such that turn ration n: 1 (n>1), transformers 30, 31 can be configured such that a voltage that is n times that of the secondary winding appears in the primary winding. Consequently, the discharging operation can be performed also when VBAT>V2 by utilizing a booster function on the primary side, thus relaxing the conditions that enable power transmission.

The functions of the circuit elements and blocks shown in the block diagrams for illustrating the control operation, such as FIG. 2, can be implemented by at least one of software processing and hardware processing. In other words, control operation unit 50 and gate signal generation unit 60 can have a computer-based configuration in which a central processing unit (CPU), not shown, executes a program pre-stored in a memory or a configuration with a field programmable gate array (FPGA), an application specific integrated circuit (ASIC), an electronic circuit (analog circuit), or the like, or can be configured with a combination thereof.

It is noted that in the power converter according to the present embodiment, switching control in which the discontinuous current mode described above is introduced needs not to be always applied regardless of load conditions or the like. In other words, switching control without the discontinuous current mode described in Embodiments 1 to 3 may be performed on other load conditions (e.g., when transmitted power is large) as long as there is a mode in which switching control in which such a discontinuous current mode is introduced is performed according to load conditions (e.g., when transmitted power is small).

Although the present disclosure describes various exemplary embodiments and examples, various features, aspects, and functions described in one or more embodiments are not limited to the application to a specific embodiment and can be applied to the embodiments alone or in various combinations.

Accordingly, numerous modifications not illustrated are assumed within the scope of the technique of the present disclosure. For example, the case where at least one component is modified, added, or omitted, and besides, the case where at least one component is extracted and combined with a component of any other embodiment are included.

It should be understood that the embodiments disclosed herein have been presented for the purpose of illustration and non-restrictive in every respect. It is therefore intended that the scope of the present disclosure is defined by claims, not only by the description above, and encompasses all variations and modifications equivalent in meaning and scope to the claims.

REFERENCE SIGNS LIST

1 storage battery; 2 load; 10 first bridge; 11-13, 21-23 leg; N11-N13, N21-N23, Ni node; 20 second bridge; 30, 31 transformer; 30$p$, 31$p$, 32$p$, 33$p$ primary winding; 30$s$, 31$s$, 32$s$, 33$s$ secondary winding; 50 control operation unit; 52, 56 deviation operation unit; 54, 58 controller; 60, 61 gate signal generation unit; 65 carrier frequency setting unit; 70 duty ratio operation unit; 75 additional pulse providing unit; 76, 77 additional pulse; 100-102 power converter; C1, C2 capacitor; CG11-CG13, CG21-CG23 carrier wave generator; CMP11-CMP13, CMP21-CMP23 comparator; CW11-CW13, CW21-CW23 carrier wave; DH, DL duty ratio; ITrp, ITrs transformer current; L1-L3, LT, LT1-LT3 reactor; LG11-LG13, LG21-LG23 logic unit; NL1, NL2, PL1, PL2 power line; PW pulse width; Q11H, Q11L, Q12H, Q12L, Q13H, Q13L, Q21L, Q21H, Q22H, Q22L, Q23H, Q23L switching element; REF1 first control command value; REF2 second control command value; REF3 third control command value; S111H, S11L, S12H, S12L, S13H, S13L, S21H, S21L, S22H, S22L, S23L, S23H gate signal; Ts switching cycle length; V1, V2 DC voltage; VBAT battery voltage; VREF1, VREF2 voltage command value; df amount of frequency change; fa reference frequency; fcw carrier frequency.

The invention claimed is:

1. A power converter that performs direct-current (DC) voltage conversion, the power converter comprising:
   a first bridge including a plurality of first legs;
   a second bridge including a plurality of second legs;
   a transformer connected between the first bridge and the second bridge;
      each of the first legs including a switching element on a high voltage side and a switching element on a low voltage side connected in series between a first power line on the high voltage side and a second power line on the low voltage side with an intermediate node in between,
      each of the second legs including a switching element on the high voltage side and a switching element on the low voltage side connected in series between a third power line on the high voltage side and a fourth power line on the low voltage side with an intermediate node in between,
      the transformer including
         a primary winding connected to a plurality of the intermediate nodes of the first legs, and
         a secondary winding connected to a plurality of the intermediate nodes of the second legs and magnetically coupled to the primary winding,
   the power converter comprising:
   a plurality of reactors respectively connected between a chargeable DC power supply and the intermediate nodes of the first legs; and
   a control circuit to control ON and OFF of a plurality of the switching elements of each of the first legs and the second legs, wherein
   the control circuit controls, in the first bridge, according to a first control command value for controlling a first DC voltage between the first power line and the second power line, ON and OFF of respective switching cycles of the switching elements of the first legs so as to provide an ON period of one switching element of the switching element on the high voltage side and the switching element on the low voltage side of each of the first legs for increasing an absolute value of a reactor current flowing through each of the reactors, and provide an ON period of the other switching element of the switching element on the high voltage side and the switching element on the low voltage side until the absolute value of the reactor current returns to zero after end of the ON period of the one switching element, and the control circuit controls, in the second bridge, ON and OFF of respective switching cycles of the switching elements of the second legs so as to reflect a second control command value for controlling a second DC voltage between the third power line and the fourth power line, and cause an ON period length of the switching element on the high voltage side of each of the second legs is substantially equal to an ON period length of the switching element on the high voltage side of each of the first legs, and an ON period length of the switching element on the low voltage side of each of the second legs is substantially equal to an ON period length of the switching element on the low voltage side of each of the first legs.

2. The power converter according to claim 1, wherein when the power converter operates to increase the second DC voltage, in each of the first legs, the one switching element is the switching element on the low voltage side, and the other switching element is the switching element on the high voltage side.

3. The power converter according to claim 1, wherein when the power converter operates to reduce the second DC voltage, in each of the first legs, the one switching element is the switching element on the high voltage side, and the other switching element is the switching element on the low voltage side.

4. The power converter according to claim 1, wherein in each of the switching cycles in the first bridge, the control circuit controls ON and OFF of the respective switching cycles of the switching elements of the first legs so as to alternately turn on and off the one switching element and the other switching element after end of the ON period of the one switching element and the ON period of the other switching element.

5. The power converter according to claim 1, wherein the control circuit controls ON and OFF of the respective switching cycles of the switching elements of the second legs so as to change a phase difference of a switching operation of the second legs from a switching operation of the first legs according to the second control command value, while fixing time lengths of the respective switching cycles of the switching elements of each of the first legs and the second legs.

6. The power converter according to claim 1, wherein the control circuit controls ON and OFF of the respective switching cycles of the switching elements of the second legs so as to change time lengths of the respective switching cycles of the switching elements of each of the first legs and the second legs according to the second control command value, while fixing a phase difference of a switching operation of the second legs from a switching operation of the first legs.

7. The power converter according to claim 1, wherein
an N (N is an integer not less than two) number of the first legs and the N number of the second legs are disposed,
in the first bridge, a phase difference is provided for every 360/N [deg] during a switching operation of the N number of first legs, and
in the second bridge, a phase difference is provided for every 360/N [deg] during a switching operation of the N number of second legs.

8. The power converter according to claim 1, wherein the reactors are configured to share a magnetic component.

9. The power converter according to claim 1, wherein in the transformer, a number of turns of the primary winding is greater than a number of turns of the secondary winding.

* * * * *